United States Patent [19]
Smith et al.

[11] Patent Number: 6,120,881
[45] Date of Patent: *Sep. 19, 2000

[54] RETROREFLECTIVE CUBE CORNER SHEETING MOLD AND SHEETING FORMED THEREFROM

[75] Inventors: Kenneth L. Smith, White Bear Lake; Gerald M. Benson, Woodbury, both of Minn.

[73] Assignee: 3M Innovative Properties Company, St. Paul, Minn.

[ * ] Notice: This patent is subject to a terminal disclaimer.

[21] Appl. No.: 09/342,410

[22] Filed: Jun. 29, 1999

Related U.S. Application Data

[63] Continuation of application No. 08/886,998, Jul. 2, 1997, Pat. No. 5,981,032.

[51] Int. Cl.$^7$ .............................. B32B 3/28; B29L 33/40
[52] U.S. Cl. ..................... 428/167; 428/172; 359/529; 264/1.9; 264/2.5; 264/220; 264/241; 156/245; 156/257
[58] Field of Search ..................... 428/156, 167, 428/172, 212, 213; 359/540, 549, 529, 530; 156/270, 209, 245, 250, 257; 264/2, 5, 1.34, 167, 175, 219, 220, 241, 281, 293, 1.9

[56] References Cited

U.S. PATENT DOCUMENTS

| | | | |
|---|---|---|---|
| Re. 29,396 | 9/1977 | Heenan | 204/281 |
| 835,648 | 11/1906 | Straubel . | |
| 1,591,572 | 7/1926 | Stimson . | |
| 3,190,178 | 6/1965 | McKenzie | 88/82 |
| 3,417,959 | 12/1968 | Schultz | 249/117 |
| 3,541,606 | 11/1970 | Heenan et al. | 350/103 |
| 3,632,695 | 1/1972 | Howell | 264/1 |
| 3,684,348 | 8/1972 | Rowland | 350/103 |
| 3,712,706 | 1/1973 | Stamm | 350/103 |
| 3,873,184 | 3/1975 | Heenan | 350/103 |
| 3,922,065 | 11/1975 | Schultz | 350/103 |
| 3,924,928 | 12/1975 | Trimble | 350/99 |
| 3,926,402 | 12/1975 | Heenan | 249/117 |

(List continued on next page.)

FOREIGN PATENT DOCUMENTS

| | | |
|---|---|---|
| 1289029 | of 0000 | France . |
| 19 17 292 | 10/1970 | Germany . |
| 92 17 179 U | 6/1993 | Germany . |
| 42 36 799 A1 | 5/1994 | Germany . |
| 42 40 680 A1 | 6/1994 | Germany . |
| 44 10 994 C2 | 1/1996 | Germany . |
| 44 29 683 C1 | 3/1996 | Germany . |
| 297 01 903 U1 | 5/1997 | Germany . |
| 8-309851 | 11/1996 | Japan . |
| WO 97/27035 | of 0000 | WIPO . |
| WO 94/18581 | 8/1994 | WIPO . |
| WO 95/11464 | 4/1995 | WIPO . |
| WO 97/04939 | 2/1997 | WIPO . |
| WO 97/04940 | 2/1997 | WIPO . |
| WO 97/45255 | 12/1997 | WIPO . |

OTHER PUBLICATIONS

Cooke, "Optical Activities In Industry," *Applied Optics*, vol. 20, No. 8, Apr. 15, 1981.

Eckhardt, H.D., "Simple Model of Corner Reflector Phenomena," *Applied Optics*, Jul., 1971, vol. 10, No. 7.

*Primary Examiner*—Donald Loney
*Attorney, Agent, or Firm*—Stephen C. Jensen

[57] ABSTRACT

Laminae suitable for use in a mold suitable for use in forming retroreflective sheeting and methods of making such laminae are disclosed. A representative lamina includes a single row of optically opposing cube corner elements disposed on its working surface. The working surface of a lamina is provided with a plurality of cube corner elements formed by the optical surfaces defined by three groove sets. Corresponding surfaces of opposing groove sets intersect substantially orthogonally along a reference edge to define first and second optical surfaces of the respective cube corner elements. The third optical surface of each respective cube corner element is defined by one surface of the third groove set.

39 Claims, 10 Drawing Sheets

U.S. PATENT DOCUMENTS

| | | | |
|---|---|---|---|
| 4,025,159 | 5/1977 | McGrath | 350/105 |
| 4,066,236 | 1/1978 | Lindner | 249/160 |
| 4,066,331 | 1/1978 | Lindner | 350/103 |
| 4,095,773 | 6/1978 | Lindner | 249/117 |
| 4,208,090 | 6/1980 | Heenan | 350/61 |
| 4,478,769 | 10/1984 | Pricone et al. | 264/1.6 |
| 4,588,258 | 5/1986 | Hoopman | 350/103 |
| 4,601,861 | 7/1986 | Pricone et al. | 264/1.6 |
| 4,775,219 | 10/1988 | Appeldorn et al. | 350/103 |
| 5,066,098 | 11/1991 | Kult et al. | 359/540 |
| 5,156,863 | 10/1992 | Pricone et al. | 425/363 |
| 5,300,263 | 4/1994 | Hoopman et al. | 264/2.5 |
| 5,450,235 | 9/1995 | Smith et al. | 359/529 |
| 5,557,836 | 9/1996 | Smith et al. | 29/527.4 |
| 5,564,870 | 10/1996 | Benson et al. | 409/131 |
| 5,585,164 | 12/1996 | Smith et al. | 428/156 |
| 5,600,484 | 2/1997 | Benson et al. | 359/529 |
| 5,898,523 | 4/1999 | Smith et al. . | |
| 6,015,214 | 1/2000 | Heenan et al. | 359/529 |

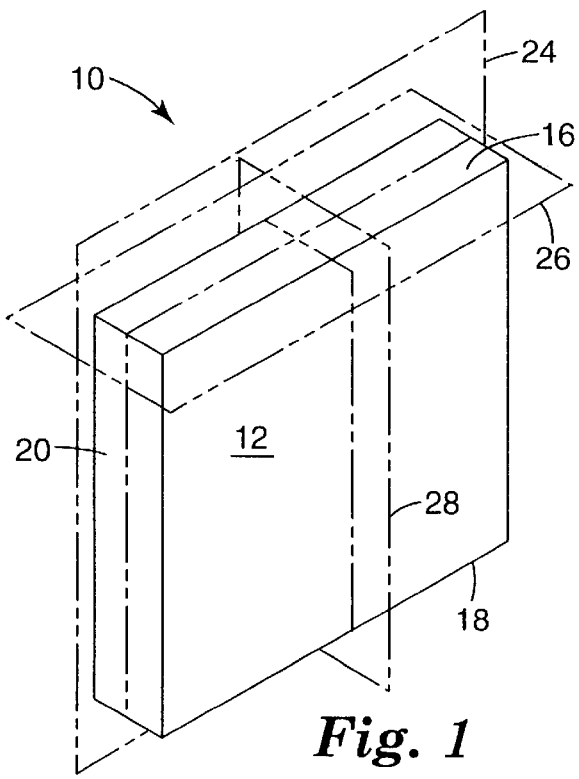
*Fig. 1*
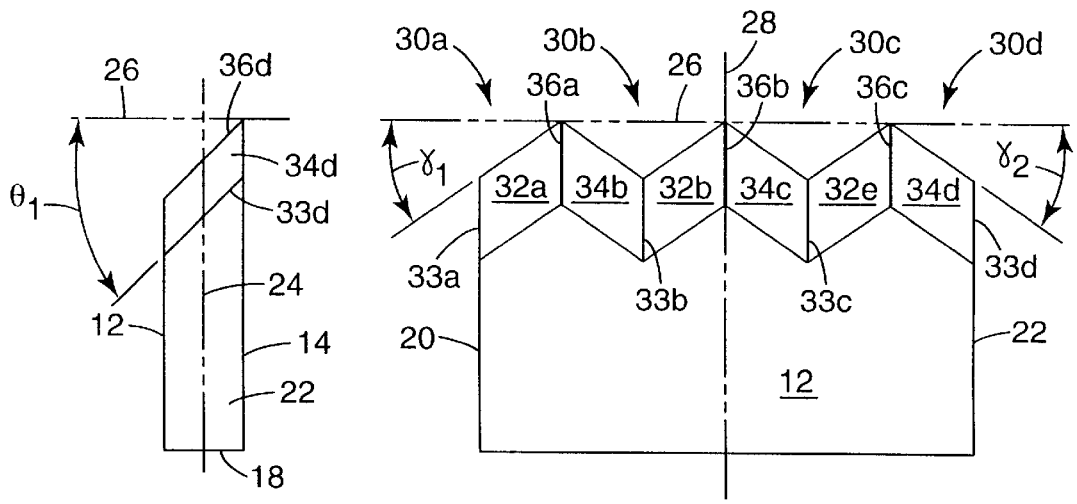
*Fig. 2*     *Fig. 3*
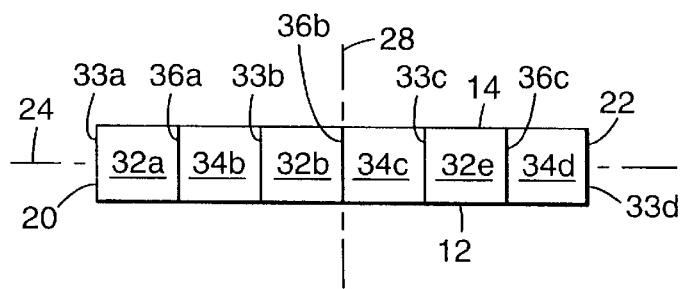
*Fig. 4*

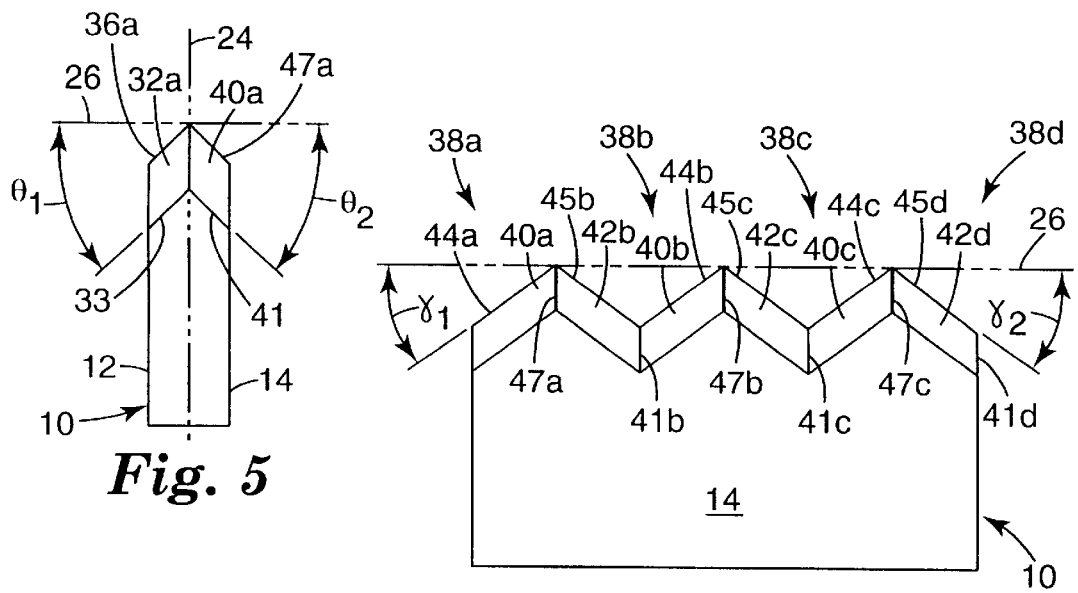
Fig. 5
Fig. 6
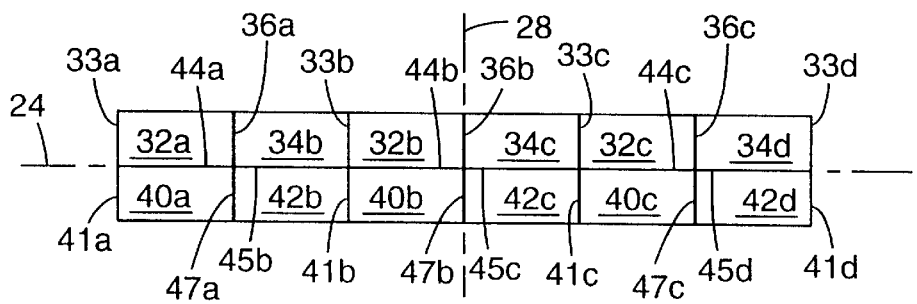
Fig. 7
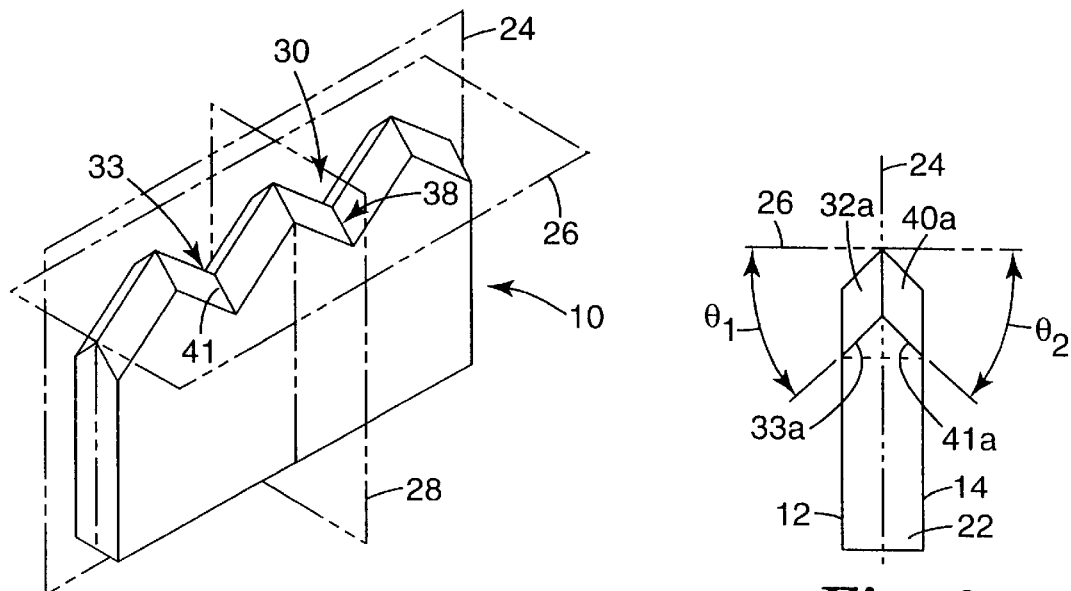
Fig. 8
Fig. 9

RETROREFLECTIVE CUBE CORNER SHEETING MOLD AND SHEETING FORMED THEREFROM

CROSS REFERENCE TO RELATED APPLICATIONS

This is a continuation of U.S. application Ser. No. 08/886,998, filed Jul. 2, 1997, now U.S. Pat. No. 5,981,032.

FIELD OF THE INVENTION

The present invention relates generally to molds suitable for use in forming cube corner retroreflective sheeting, to methods for making the same, and to retroreflective sheeting formed from such molds. In particular, the invention relates to molds formed from a plurality of thin laminae and to methods for making the same.

BACKGROUND OF THE INVENTION

Retroreflective materials are characterized by the ability to redirect light incident on the material back toward the originating light source. This property has led to the widespread use of retroreflective sheeting in a variety of conspicuity applications. Retroreflective sheeting is frequently used on flat, rigid articles such as, for example, road signs and barricades; however it is also used on irregular or flexible surfaces. For example, retroreflective sheeting can be adhered to the side of a truck trailer, which requires the sheeting to pass over corrugations and protruding rivets, or the sheeting can be adhered to a flexible body portion such as a road worker's safety vest or other such safety garment. In situations where the underlying surface is irregular or flexible, the retroreflective sheeting desirably possesses the ability to conform to the underlying surface without sacrificing retro-reflective performance. Additionally, retroreflective sheeting is frequently packaged and shipped in roll form, thus requiring the sheeting to be sufficiently flexible to be rolled around a core.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Illustrative examples are disclosed in U.S. Pat. Nos. 3,190,178 (McKenzie), 4,025,159 (McGrath), and 5,066,098 (Kult). Advantageously, microsphere-based sheeting can generally be adhered to corrugated or flexible surfaces. Also, due to the symmetrical geometry of beaded retroreflectors, microsphere based sheeting exhibits a relatively orientationally uniform total light return when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting comprises a body portion typically having a substantially planar base surface and a structured surface comprising a plurality of cube corner elements opposite the base surface. Each cube-corner element comprises three mutually substantially perpendicular optical faces that intersect at a single reference point, or apex. The base of the cube corner element acts as an aperture through which light is transmitted into the cube corner element. In use, light incident on the base surface of the sheeting is refracted at the base surface of the sheeting, transmitted through the bases of the cube corner elements disposed on the sheeting, reflected from each of the of the three perpendicular cube-corner optical faces, and redirected toward the light source. The symmetry axis, also called the optical axis, of a cube corner element is the axis that extends through the cube corner apex and forms an equal angle with the three optical faces of the cube corner element. Cube corner elements typically exhibit the highest optical efficiency in response to light incident on the base of the element roughly along the optical axis. The amount of light retroreflected by a cube corner retroreflector drops as the incidence angle deviates from the optical axis.

The maximum retroreflective efficiency of cube corner retroreflective sheeting is a function of the geometry of the cube corner elements on the structured surface of the sheeting. The terms 'active area' and 'effective aperture' are used in the cube corner arts to characterize the portion of a cube corner element that retroreflects light incident on the base of the element. A detailed teaching regarding the determination of the active aperture for a cube corner element design is beyond the scope of the present disclosure. One procedure for determining the effective aperture of a cube corner geometry is presented in Eckhardt, Applied Optics, v. 10, n. 7, July, 1971, pp. 1559–1566. U.S. Pat. No. 835,648 to Straubel also discusses the concept of effective aperture. At a given incidence angle, the active area can be determined by the topological intersection of the projection of the three cube corner faces onto a plane normal to the refracted incident light with the projection of the image surfaces for the third reflections onto the same plane. The term 'percent active area' is then defined as the active area divided by the total area of the projection of the cube corner faces. The retroreflective efficiency of retroreflective sheeting correlates directly to the percentage active area of the cube corner elements on the sheeting.

Additionally, the optical characteristics of the retroreflection pattern of retroreflective sheeting are, in part, a function of the geometry of the cube corner elements. Thus, distortions in the geometry of the cube corner elements can cause corresponding distortions in the optical characteristics of the sheeting. To inhibit undesirable physical deformation, cube corner elements of retroreflective sheeting are typically made from a material having a relatively high elastic modulus sufficient to inhibit the physical distortion of the cube corner elements during flexing or elastomeric stretching of the sheeting. As discussed above, it is frequently desirable that retroreflective sheeting be sufficiently flexible to allow the sheeting to be adhered to a substrate that is corrugated or that is itself flexible, or to allow the retroreflective sheeting to be wound into a roll to facilitate storage and shipping.

Cube corner retroreflective sheeting is manufactured by first manufacturing a master mold that includes an image, either negative or positive, of a desired cube corner element geometry. The mold can be replicated using nickel electroplating, chemical vapor deposition or physical vapor deposition to produce tooling for forming cube corner retroreflective sheeting. U.S. Pat. No. 5,156,863 to Pricone, et al. provides an illustrative overview of a process for forming tooling used in the manufacture of cube corner retroreflective sheeting. Known methods for manufacturing the master mold include pin-bundling techniques, direct machining techniques, and laminate techniques. Each of these techniques has benefits and limitations.

In pin bundling techniques, a plurality of pins, each having a geometric shape on one end, are assembled together to form a cube-corner retroreflective surface. U.S. Pat. Nos. 1,591,572 (Stimson), 3,926,402 (Heenan), 3,541,606 (Heenan et al.) and 3,632,695 (Howell) provide illustrative examples. Pin bundling techniques offer the ability to manufacture a wide variety of cube corner geometries in a single mold. However, pin bundling techniques are economically and technically impractical for making small cube corner elements (e.g. less than about 1.0 millimeters).

In direct machining techniques, a series of grooves is formed in a unitary substrate to form a cube-corner retroreflective surface. U.S. Pat. Nos. 3,712,706 (Stamm) and 4,588,258 (Hoopman) provide illustrative examples. Direct machining techniques offer the ability to accurately machine very small cube corner elements which are compatible with flexible retroreflective sheeting. However, it is not presently possible to produce certain cube corner geometries that have very high effective apertures at low entrance angles using direct machining techniques. By way of example, the maximum theoretical total light return of the cube corner element geometry depicted in U.S. Pat. No. 3,712,706 is approximately 67%.

In laminate techniques, a plurality of laminae, each lamina having geometric shapes on one end, are assembled to form a cube-corner retroreflective surface. German Provisional Publication (OS) 19 17 292, International Publication Nos. WO 94/18581 (Bohn, et al.), WO 97/04939 (Mimura et al.), and WO 97/04940 (Mimura et al.), all disclose a molded reflector wherein a grooved surface is formed on a plurality of plates. The plates are then tilted by a certain angle and each second plate is shifted crosswise. This process results in a plurality of cube corner elements, each element formed by two machined surfaces and one side surface of a plate. German Patent DE 42 36 799 to Gubela discloses a method for producing a molding tool with a cubical surface for the production of cube corners. An oblique surface is ground or cut in a first direction over the entire length of one edge of a band. A plurality of notches are then formed in a second direction to form cube corner reflectors on the band. Finally, a plurality of notches are formed vertically in the sides of the band. German Provisional Patent 44 10 994 C2 to Gubela is a related patent.

BRIEF SUMMARY OF THE INVENTION

The present application discloses a master mold suitable for use in forming retroreflective sheeting from a plurality of laminae and methods of making the same. Advantageously, master molds manufactured according to the present teachings enable the manufacture of retroreflective cube corner sheeting that exhibits retroreflective efficiency levels approaching 100%. To facilitate the manufacture of flexible retroreflective sheeting, the disclosed methods enable the manufacture of cube corner retroreflective elements having a width as small as 0.010 millimeters. Additionally, the disclosure teaches the manufacture of a cube corner retroreflective sheeting that exhibits symmetrical retroreflective performance in at least two different orientations. Efficient, cost-effective methods of making molds formed from a plurality of laminae are also disclosed.

One embodiment relates to a lamina suitable for use in a mold for use in forming retroreflective cube corner articles, the lamina having opposing first and second major surfaces defining therebetween a first reference plane, the lamina further including a working surface connecting the first and second major surfaces, the working surface defining a second reference plane substantially parallel to the working surface and perpendicular to the first reference plane and a third reference plane perpendicular to the first reference plane and the second reference plane. The lamina includes: (a) a first groove set including at least one V-shaped groove in the working surface of the lamina, the groove defining a first groove surface and a second groove surface that intersect to define a first groove vertex; (b) a second groove set including at least one V-shaped groove in the working surface of the lamina, the groove defining a third groove surface and a fourth groove surface that intersect to define a second groove vertex, the third groove surface intersecting the first groove surface substantially orthogonally to define a first reference edge; and (c) a third groove set including at least two parallel adjacent V-shaped grooves in the working surface of the lamina, each groove defining a fifth groove surface and a sixth groove surface that intersect to define a third groove vertex, the fifth groove surface intersecting substantially orthogonally with the first and third groove surfaces to form at least one cube corner disposed in a first orientation.

In one embodiment, the first and second groove sets are formed such that the respective first and third groove surfaces intersect approximately orthogonally to define reference edges, and the second and fourth groove surfaces intersect approximately orthogonally to define reference edges, that are substantially parallel to the first reference plane. Finally, the third groove set comprises a plurality of grooves having respective vertices that extend along an axis perpendicular to the first reference plane. In this embodiment, the lamina comprises a single row of optically opposing cube corner elements disposed on the working surface of the lamina.

The three mutually perpendicular optical faces of each cube corner element are preferably formed on a single lamina. All three optical faces are preferably formed by the machining process to ensure optical quality surfaces. A planar interface is preferably maintained between adjacent laminae during the machining phase and subsequent thereto so as to minimize alignment problems and damage due to handling of the laminae.

A method is disclosed for manufacturing a lamina for use in a mold suitable for use in forming retroreflective cube corner articles, the lamina having opposing first and second major surfaces defining therebetween a first reference plane, the lamina further including a working surface connecting the first and second major surfaces, the working surface defining a second reference plan substantially parallel to the working surface and perpendicular to the first reference plane and a third reference lane perpendicular to the first reference plane and the second reference plane. The method includes: (a) forming a first groove set including at least one V-shaped groove in the working surface of the lamina, the groove defining a first groove surface and a second groove surface that intersect to define a first groove vertex; (b) forming a second groove set including at least one V-shaped groove in the working surface of the lamina, the groove defining a third groove surface and a fourth groove surface that intersect to define a second groove vertex, the third groove surface intersecting the first groove surface substantially orthogonally to define a first reference edge; and (c) forming a third groove set including at least two parallel adjacent V-shaped grooves in the working surface of the lamina, each groove defining a fifth groove surface and a sixth groove surface that intersect to define a third groove vertex, a fifth groove surface intersecting substantially orthogonally with the first and third groove surfaces to form at least one cube corner disposed in a first orientation.

A preferred mold assembly includes a plurality of laminae, the laminae including opposed parallel first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane. The working surface of a plurality of the laminae includes: (a) a first groove set including at least two parallel adjacent V-shaped grooves in the working surface of each of the laminae, a plurality of the adjacent grooves defining a first groove surface and a second groove surface that intersect to define a first groove vertex; (b) a second groove set including at least two parallel adjacent V-shaped grooves in the working surface of each of the laminae, a plurality of the adjacent grooves defining a third groove surface and a fourth groove surface that intersect to define a second groove vertex, the third groove surface intersecting the first groove surface substantially orthogonally to define a first reference edge; and (c) a third groove set including at least two parallel adjacent V-shaped grooves in the working surface of the laminae, the third groove defining a fifth groove surface and a sixth groove surface that intersect to define a third groove vertex, the fifth groove surface intersecting substantially orthogonally with the first and third groove surfaces to form at least one cube corner disposed in a first orientation.

In one embodiment, the first and second groove sets are formed such that their respective vertices extend along axes that, in a top plan view, are perpendicular to the respective first reference planes. Finally, the third groove set comprises a plurality of grooves having respective vertices that extend along axes perpendicular to the first reference plane. In this embodiment, each lamina comprises a single row of optically opposing cube corner elements disposed on the working surface of the lamina.

Also disclosed is a method of manufacturing a plurality of laminae for use in a mold suitable for use in forming retroreflective cube corner articles, each lamina having opposing first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane. The method includes: (a) orienting a plurality of laminae to have their respective first reference planes parallel to each other and disposed at a first angle relative to a fixed reference axis; (b) forming a first groove set including a plurality of V-shaped grooves in the working surface of the lamina, the respective grooves defining a first groove surface and a second groove surface that intersect to define a first groove vertex; (c) orienting the plurality of laminae to have their respective first reference planes parallel to each other and disposed at a second angle relative to the fixed reference axis; (d) forming a second groove set including a plurality of V-shaped grooves in the working surface of the lamina, the respective grooves defining a third groove surface and a fourth groove surface that intersect to define a second groove vertex, the respective third groove surfaces intersecting the first groove surfaces substantially orthogonally to define a first reference edge; and (e) forming a third groove set including a plurality of V-shaped grooves in the working surface of the lamina, the respective third grooves defining a fifth groove surface and a sixth groove surface that intersect to define a third groove vertex, the fifth groove surface intersecting substantially orthogonally with the first and third groove surfaces to form at least one cube corner disposed in a first orientation.

In one disclosed method, the plurality of laminae are assembled in a suitable fixture that defines a base plane. Preferably, the fixture secures the laminae such that their respective first reference planes are substantially parallel and are disposed at a first angle that preferably measures between 45° and 90°, and more preferably measures between 45° and 60° relative to a fixed reference axis that is a normal vector to the base plane. The first groove set is then formed by removing portions of each of the plurality of lamina proximate the working surface of the plurality of laminae by using a suitable material removal technique such as, for example, ruling, fly-cutting, grinding, or milling. The plurality of laminae are then reassembled in the fixture and secured such that their respective first reference planes are substantially parallel and are disposed at a second angle of between 45° and 90°, and more preferably between 45° and 60° relative to a fixed reference axis that is a normal vector to the base plane. The second groove set is then formed using suitable material removal techniques as describe above. The plurality of laminae are then reassembled in the fixture and secured such that their respective first reference planes are substantially parallel to the reference axis. The third groove set is then formed using suitable material removal techniques as described above.

BRIEF DESCRIPTION OF THE DRAWINGS

FIG. 1 is a perspective view of a single lamina suitable for use in the disclosed methods.

FIG. 2 is an end view of a single lamina following a first machining step.

FIG. 3 is a side view of a single lamina following a first machining step.

FIG. 4 is a top view of a single lamina following a first machining step.

FIG. 5 is an end view of a single lamina following a second machining step.

FIG. 6 is a side view of a single lamina following a second machining step.

FIG. 7 is a top view of a single lamina following a second machining step.

FIG. 8 is a perspective view of a single lamina following a second machining step.

FIG. 9 is an end view of a single lamina following a third machining step.

DETAILED DESCRIPTION OF THE PREFERRED EMBODIMENTS

Figure 10:
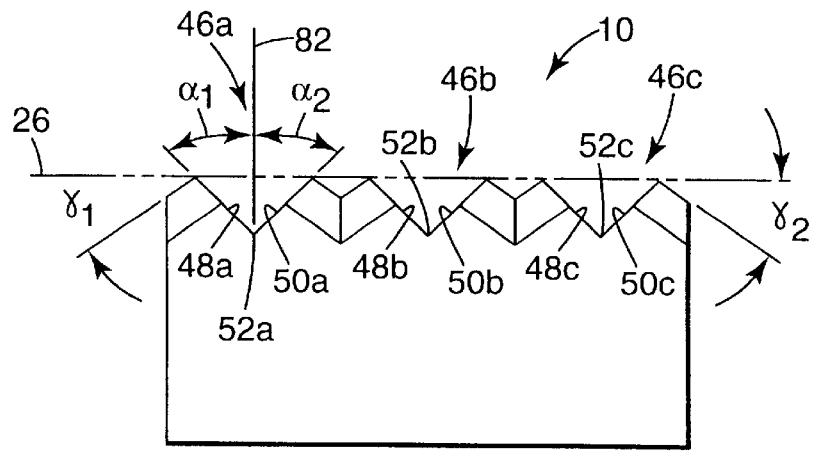
FIG. 10 is a side view of a single lamina following a third machining step.

In describing various embodiments, specific terminology will be used for the sake of clarity. Such terminology is not, however, intended to be limiting and it is to be understood that each term so selected includes all technical equivalents that function similarly. Related applications filed on the same date herewith include: Cube Corner Sheeting Mold and Method Making the Same (Atty. Docket No. 51946USA9A); Retroreflective Cube Corner Sheeting, Molds Therefore, and Methods of Making the Same (Atty. Docket No. 53318USA8A); Tiled Retroreflective Sheeting Composed of Highly Canted Cube Corner Elements (Atty. Docket No. 53285USA9A); Retroreflective Cube Corner Sheeting Mold and Method of Making the Same (Atty. Docket No. 51952USA6A); and Dual Orientation Retroreflective Sheeting (Atty. Docket No. 52303USA8B).

The disclosed embodiments can utilize full cube corner elements of a variety of sizes and shapes. The base edges of adjacent full cube corner elements in an array are not all in the same plane. By contrast, the base edges of adjacent truncated cube corner elements in an array are typically coplanar. Full cube corner elements have a higher total light return than truncated cube corner elements for a given amount of cant, but the full cubes lose total light return more rapidly at higher entrance angles. One benefit of full cube corner elements is higher total light return at low entrance angles, without too large of a loss in performance at higher entrance angles.

Predicted total light return (TLR) for a cube corner matched pair array can be calculated from a knowledge of percent active area and ray intensity. Ray intensity may be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is presented in U.S. Pat. No. 3,712,706 (Stamm).

One embodiment of a lamina, as well as a method of making the same, will now be described with reference to FIGS. 1–12. Referring to FIG. 1, there is illustrated a representative lamina 10 useful in the manufacture of a mold suitable for forming retroreflective sheeting. Lamina 10 includes a first major surface 12 and an opposing second major surface 14. Lamina 10 further includes a working surface 16 and an opposing bottom surface 18 extending between first major surface 12 and second major surface 14. Lamina 10 further includes a first end surface 20 and an opposing second end surface 22. In a preferred embodiment, lamina 10 is a right rectangular polyhedron wherein opposing surfaces are substantially parallel. However, it will be appreciated that opposing surfaces of lamina 10 need not be parallel.

For purposes of description, a Cartesian coordinate system can be superimposed onto lamina 10. A first reference plane 24 is centered between first major surface 12 and second major surface 14. First reference plane 24, referred to as the x-z plane, has the y-axis as its normal vector. A second reference plane 26, referred to as the x-y plane, extends substantially co-planar with working surface 16 of lamina 10 and has the z-axis as its normal vector. A third reference plane 28, referred to as the y-z plane, is centered between first end surface 20 and second end surface 22 and has the x-axis as its normal vector. For the sake of clarity, various geometric attributes of the present invention will be described with reference to the Cartesian reference planes as set forth herein. However, it will be appreciated that such attributes can be described using other coordinate systems or with reference to the structure of the lamina.

The laminae are preferably formed from a dimensionally stable material capable of holding precision tolerances, such as machinable plastics (for example, polyethylene teraphthalate, polymethyl methacrylate, and polycarbonate) or metals (for example, brass, nickel, copper, or aluminum). The physical dimensions of the laminae are constrained primarily by machining limitations. The laminae preferably measure at least 0.1 millimeters in thickness, between 5.0 and 100.0 millimeters in height, and between 10 and 500 millimeters in width. These measurements are provided for illustrative purposes only and are not intended to be limiting.

Figure 11:
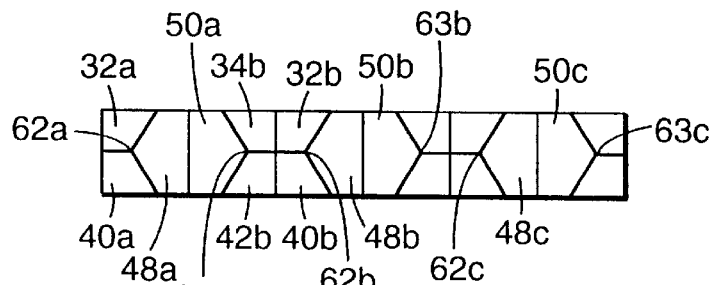
FIG. 11 is a top view of a single lamina following a third machining step.

FIGS. 2–12 illustrate the formation of a structured surface comprising a plurality of optically opposing cube corner elements in the working surface 16 of lamina 10. In brief summary, a first groove set comprising a plurality of parallel, adjacent grooves 30a, 30b, 30c, etc. (collectively referred to as 30) is formed in the working surface 16 of lamina 10 (FIGS. 2–4). The grooves 30 define first groove surfaces 32a, 32b, 32c, etc. and second groove surfaces 34b, 34c, 34d, etc. A second groove set comprising at least one, and preferably a plurality of parallel, adjacent grooves 38a, 38b, 38c, etc. (collectively referred to as 38) is also formed in the working surface 16 of lamina 10 (FIGS. 5–7). The grooves 38 define third groove surfaces 40a, 40b, 40c, etc. and fourth groove surfaces 42b, 42c, 42d, etc. Importantly, the first groove surfaces 32a, 32b, 32c, etc. intersect the respective third groove surfaces 40a, 40b, 40c, etc. substantially orthogonally to define respective first reference edges 44a, 44b, 44c, etc., and the second groove surfaces 34b, 34c, 34d, etc. intersect the respective fourth groove surfaces 42b, 42c, 42d, etc. substantially orthogonally to define respective second reference edges 45b, 45c, 45d, etc. As used herein, the terms 'substantially orthogonally' or 'approximately orthogonally' shall mean that the dihedral angle between the respective surfaces measures approximately 90°; slight variations in orthogonality as disclosed and claimed in U.S. Pat. No. 4,775,219 to Appeldorn are contemplated. A third groove set comprising a plurality of parallel adjacent grooves 46a, 46b, 46c, etc. is then formed in the working surface 16 of lamina 10 (FIGS. 9–11). The grooves of the third groove set define respective fifth groove surfaces 48a, 48b, 48c, etc. and sixth groove surfaces 50a, 50b, 50c, etc. Importantly, the respective fifth groove surfaces 48a, 48b, 48c, etc. intersect the respective first groove surfaces 32a, 32b, 32c, etc. and third groove surfaces 40a, 40b, 40c, etc. substantially orthogonally to form a plurality of cube corner elements. Additionally, the respective sixth groove surfaces 50a, 50b, 50c, etc. intersect the respective second groove surfaces 34b, 34c, 34d, etc. and fourth groove surfaces 42b, 42c, 42d, etc. substantially orthogonally to form a plurality of cube corner elements. As used herein, the term 'groove set' refers to a plurality of parallel, although not necessarily coplanar, grooves formed in working surface 16 of the lamina 10.

Referring now to FIGS. 2–4, a first groove set comprising at least one, and preferably a plurality of parallel, adjacent grooves 30a, 30b, 30c, etc. (collectively referred to as 30) is formed in the working surface 16 of lamina 10. The grooves define first groove surfaces 32a, 32b, 32c, etc. (collectively referred to as 32) and second groove surfaces 34b, 34c, 34d, etc. (collectively referred to as 34) that intersect at groove vertices 33a, 33b, 33c, 33d, etc. (collectively referred to as 33) and along edges 36a, 36b, 36c, etc., as shown. At the edge of the lamina, the groove forming operation may form a single groove surface, e.g. 32a, 34d. Preferably this pattern is repeated across the entire working surface 16 of lamina 10 as illustrated in FIGS. 2–4. The groove vertices 33 are preferably separated by a distance that measures between about 0.01 millimeters and about 1.0 millimeters, however it is not intended that the present invention be limited by these dimensions.

Referring particularly to FIG. 2, the grooves 30 are formed such that the respective groove vertices 33 extend along an axis that intersects first major surface 12, second major surface 14, and second reference plane 26. In the embodiment depicted in FIGS. 2–4 the grooves 30 are formed such that each of the respective groove vertices 33 are disposed in planes that intersect the first reference plane 24 and the second reference plane 26 at orthogonal angles such that, in the top view of FIG. 4, the respective groove vertices 33 appear perpendicular to first reference plane 24.

In FIGS. 2–4, the respective groove vertices 33 intersect the second reference plane 26 at an acute angle $\theta_1$ that measures approximately 54.74°. It will be appreciated, however, that grooves 30 may be formed such that the respective groove vertices 33 intersect second reference plane 26 at angles different than 54.74°. In general, it is feasible to form grooves such that the respective groove vertices 33 intersect the second reference planes at any angle between about 45° and nearly 90°. Additionally, the dihedral angle between opposing faces of grooves 30 (e.g. 34b and 32b), measures 120° in the embodiment depicted in FIGS. 2–4. More generally, this angle can vary between 90° and 180°.

Referring now to FIGS. 5–8, a second groove set comprising at least two parallel, adjacent grooves 38a, 38b, 38c, etc. (collectively referred to as 38) is formed in the working surface 16 of lamina 10. The grooves define third groove surfaces 40a, 40b, 40c, etc. (collectively referred to as 40) and fourth groove surfaces 42b, 42c, 42d, etc. (collectively referred to as 42) that intersect at a groove vertex 41b, 41c, 41d, etc. (collectively referred to as 41) and edges 47a, 47b, 47c, etc. At the edge of the lamina, the groove forming operation may form a single groove surface, e.g. 40a, 42d. Groove 38a is formed such that groove surfaces 32a and 40a intersect approximately orthogonally along a first reference edge 44a. Similarly, groove 38b is formed such that groove surfaces 34b and 42b intersect approximately orthogonally along a second reference edge 45b and groove surfaces 32b and 40b intersect approximately orthogonally along a reference edge 44b. Preferably this pattern is repeated across the entire working surface 16 of lamina 10. The respective groove vertices 41 are preferably separated by a distance that measures between about 0.01 millimeters and about 1.0 millimeters, however it is not intended that the present invention be limited by these dimensions.

Referring again to FIGS. 5–8, grooves 38 are formed such that the respective groove vertices 41 extend along an axis that intersects second major surface 14 and second reference plane 26. Similarly, the grooves 38 are formed such that each of the respective groove vertices 41 are disposed in planes that intersect the first reference plane 24 and the second reference plane 26 at orthogonal angles such that, in the top view of FIG. 7, the respective groove vertices 41 appear perpendicular to first reference plane 24. Additionally, referring particularly to FIG. 7, it can be seen that the grooves 38 in the second groove set are preferably formed such that the respective groove vertices 41a, 41b, 41c, etc. are substantially coplanar with respective groove vertices 33a, 33b, 33c of first groove set 30. It will be appreciated, however, that opposing respective groove vertices(e.g. 33, 41) need not be coplanar.

The respective groove vertices 41 intersect the second reference plane 26 at an acute angle $\theta_2$ that measures approximately 54.74°. It will be appreciated, however, that grooves 38 may be formed such that the respective groove vertices 41 intersect second reference plane 26 at angles different than 54.74°. Additionally, although the disclosed embodiment is manufactured such that $\theta_1$ is equal to $\theta_2$, these angles may differ from one another. The relationship between angles $\theta_1$ and $\theta_2$ is discussed in greater detail below. In general, it is feasible to form grooves such that the respective groove vertices 41 intersect the second reference plane 26 at any angle between about 45° and about 90°, more preferably, however, the grooves are formed such that the angle $\theta_1$ is equal to $\theta_2$, and the angles preferably measure between about 45° and about 60°. In the disclosed embodiment the dihedral angle between opposing faces of grooves 38 (e.g. 42b and 40b), measures 120°. Thus, reference edges 44, 45 are disposed at angles $\gamma_1$ and $\gamma_2$, respectively, that measure approximately 45° from second reference plane 26.

FIG. 8 presents a perspective view of a representative lamina 10 upon completion of forming the grooves 38 in the second groove set. Lamina 10 includes a series of grooves 30, 38 formed in the working surface 16 thereof as described above. The respective groove vertices intersect approximately along the first reference plane 24 to define a plurality of substantially V-shaped valleys in the working surface 16 of lamina 10.

FIGS. 9–12 illustrate an embodiment of lamina 10 following formation of a third groove set comprising a plurality of groovs 46a, 46b, 46c, etc. in lamina 10. In the disclosed embodiment the third grooves 46 define respective fifth groove surfaces 48a, 48b, 48c, etc. and respective sixth groove surfaces 50a, 50b, 50c, etc. that intersect at respective groove vertices 52a, 52b, 52c. The grooves 46 are formed such that the respective groove vertices 52 extend along an axis that is substantially perpendicular to first reference plane 24. The third grooves 46 are formed such that the respective fifth groove surfaces 48 are disposed in planes that are substantially orthogonal to the respective first groove surfaces 32 and the respective third groove surfaces 40 and the respective sixth groove surfaces 50 are disposed in planes that are substantially orthogonal to the respective second groove surfaces 34 and the respective fourth groove surfaces 42. In the disclosed embodiment third grooves 46 are formed such that the respective groove surfaces 48, 50 are disposed at angles $\alpha_1$, $\alpha_2$, respectively, that measure 45° from an axis 82 normal to second reference plane 26. More generally, the angle $\alpha_1$ is equal to $\gamma_1$ and the angle $\alpha_2$ is equal to $\gamma_2$.

Formation of the respective fifth groove surfaces 48 according to the invention yields a plurality of cube corner elements 60a, 60b, etc. (collectively referred to by reference numeral 60) in working surface 16 of lamina 10 having three mutually perpendicular optical surfaces. Each cube corner element 60 is defined by a respective first groove surface 32a, 32b, 32c, etc., a respective third groove surface 40a, 40b, 40c, etc. and a respective fifth groove surface 48a, 48b, 48c, etc. that mutually intersect at a point to define a respective cube corner peak, or apex 62a, 62b, 62c, etc. Similarly, formation of the respective sixth groove surfaces 50 also yields a plurality of cube corner elements 70a, 70b, 70c, etc. (collectively referred to by reference numeral 70) in working surface 16 of lamina 10. Each cube corner element 70 is defined by a respective second groove surface 34b, 34c, 34d, etc., a respective fourth groove surface 42b, 42c, 42d, etc. and a respective sixth groove surface 50a, 50b, 50c, etc. that mutually intersect at a point to define a respective cube corner peak, or apex 63a, 63b, 63c, etc. Preferably, both fifth groove surface 48 and sixth groove surface 50 form a plurality of cube corner elements on the working surface 16 of lamina 10. However, it will be appreciated that in alternate embodiments the respective third grooves 46 could be formed such that only the fifth groove surfaces 48 or the sixth groove surfaces 50 form cube corner elements.

Preferably, working surface 16 is formed using conventional precision machining tooling and techniques. Appropriate material removal techniques for forming the grooves in lamina 10 include precision engineering techniques such as, for example, ruling, milling, grooving, and fly-cutting. In one embodiment second major surface 14 of lamina 10 can be registered to a substantially planar surface such as the surface of a precision machining fixture and each groove 30a, 30b, 30c, etc. can be formed in working surface 16 by moving a V-shaped cutting tool having an included angle of 120° along an axis that intersects the first working surface 12 and the first reference plane 24 at an angle of about 35.26° (90°-$\theta_1$).

In the disclosed embodiment each respective groove 30 is formed at the same depth in working surface 16 and the cutting tool is moved laterally by the same distance between adjacent grooves such that grooves are substantially identical. Next, first major surface 12 of lamina 10 can be registered to the planar surface and each groove 38a, 38b, 38c, etc. can be formed in working surface 16 by moving a V-shaped cutting tool having an included angle of 120° along an axis that intersects the second working surface 14 and the first reference plane 24 at an angle of about 35.26° (90°-$\theta_1$). Finally, third grooves 46a, 46b, 46c, etc. can be formed in working surface 16 by moving a V-shaped cutting tool having an included angle of 90° along an axis substantially perpendicular to first reference plane 24.

While the three groove forming steps have been recited in a particular order, one of ordinary skill in the art will recognize that the order of the steps is not critical; the steps can be practiced in any order. Additionally, one of ordinary skill in the art will recognize that the three groove sets can be formed with the lamina registered in one position; the present disclosure contemplates such a method. Furthermore, the particular mechanism for securing the lamina to the precision machining fixture is not critical; physical, chemical, and electromagnetic mechanisms of securing the lamina can be used.

To form a mold suitable for use in forming retroreflective articles, a plurality of laminae 10 having a working surface 16 that includes cube corner elements 60, 70 formed as described above can be assembled together in a suitable conventional fixture. Working surface 16 can then be replicated using precision replication techniques such as, for example, nickel electroplating to form a negative copy of working surface 16. Electroplating techniques are known to those of ordinary skill in the retroreflective arts. See e.g. U.S. Pat. Nos. 4,478,769 and 5,156,863 to Pricone et al. The negative copy of working surface 16 can then be used as a mold for forming retroreflective articles having a positive copy of working surface 16. More commonly, additional generations of electroformed replicas are formed and assembled together into a larger mold. It will be noted that the original working surfaces 16 of the lamina 10, or positive copies thereof, could also be used as an embossing tool to form retroreflective articles. See, JP 8-309851 and U.S. Pat. No. 4,601,861 (Pricone). One of ordinary skill in the retroreflective arts will recognize that the working surface 16 of each lamina 10 functions independently as a retroreflector. Thus, adjacent lamina in the mold need not be positioned at precise angles or distances relative to one another.

Figure 13:
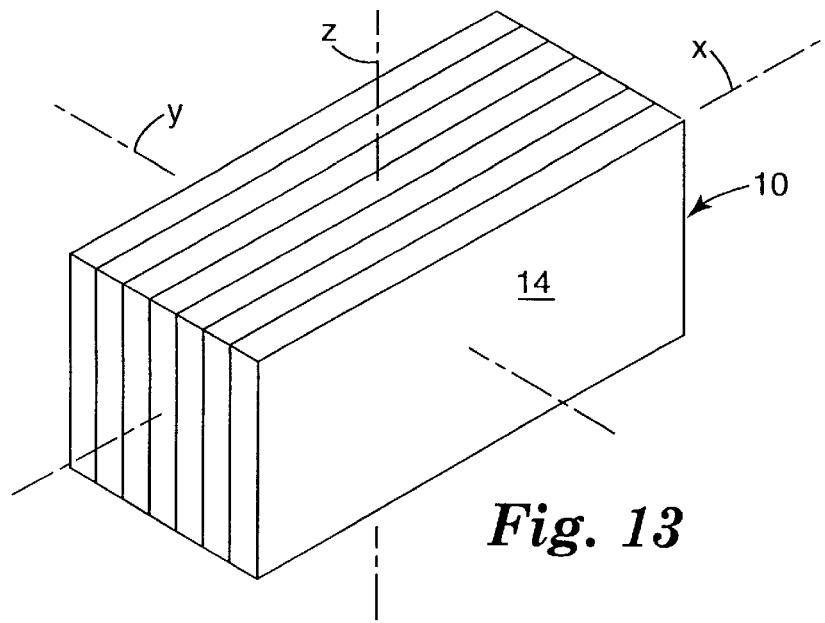
FIG. 13 is a perspective view of a plurality of laminae suitable for use in the disclosed methods.
Figure 14:
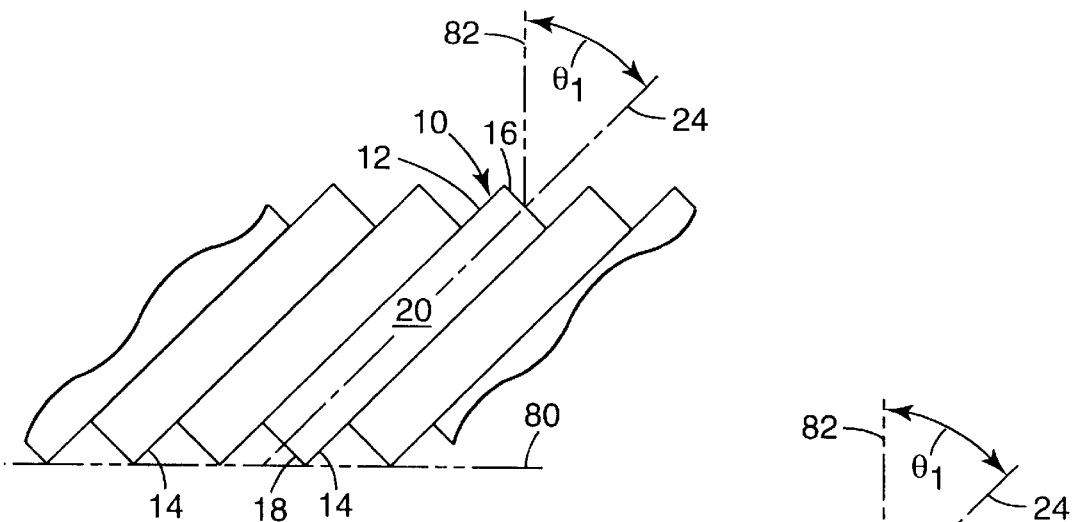
FIG. 14 is an end view of the plurality of laminae oriented in a first orientation.
Figure 15:
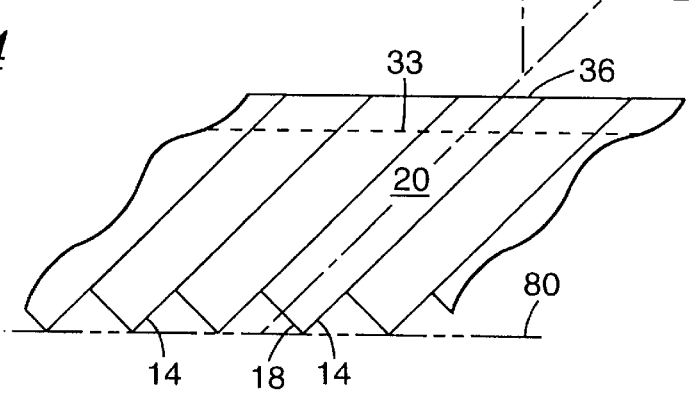
FIG. 15 is an end view of the plurality of laminae following a first machining operation.
Figure 16:
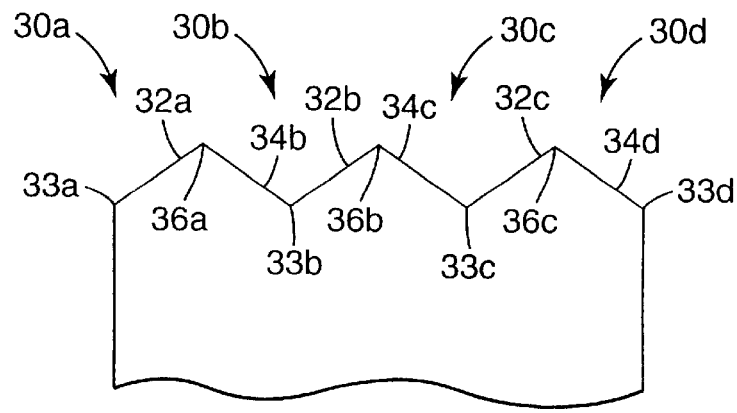
FIG. 16 is a side view of the plurality of laminae following a first machining operation.
Figure 17:
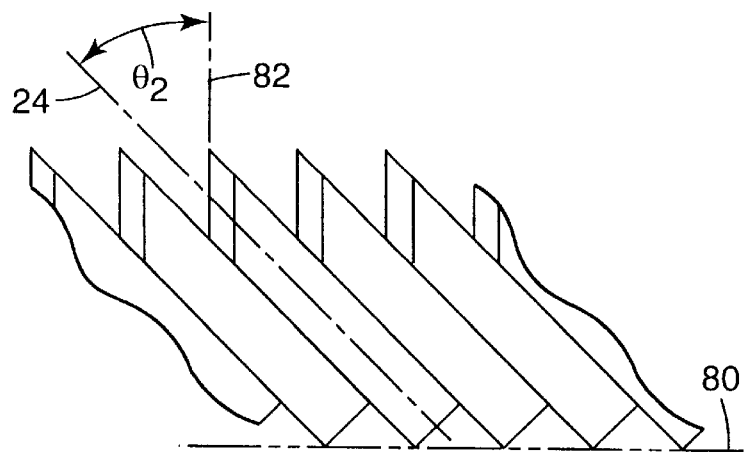
FIG. 17 is an end view of the plurality of laminae oriented in a second orientation.
Figure 18:
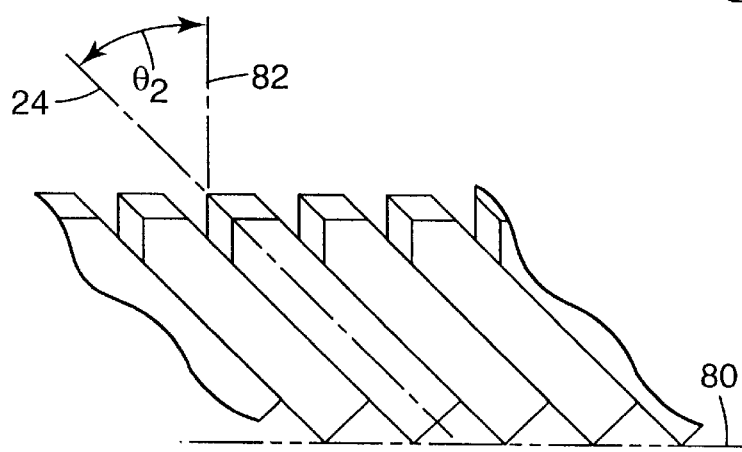
FIG. 18 is an end view of the plurality of laminae following a second machining operation.
Figure 19:
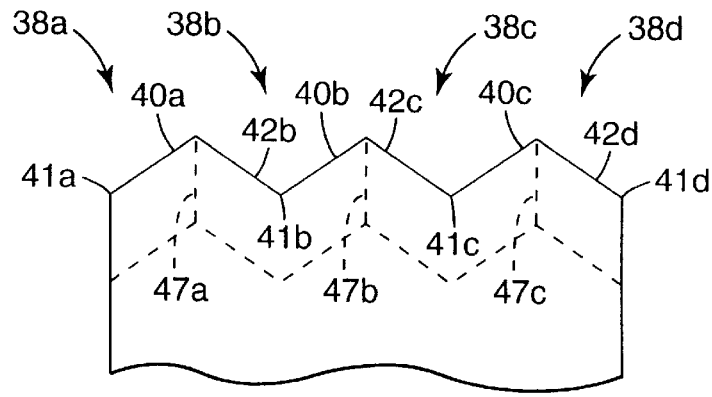
FIG. 19 is a side view of the plurality of laminae following a second machining operation.
Figure 20:
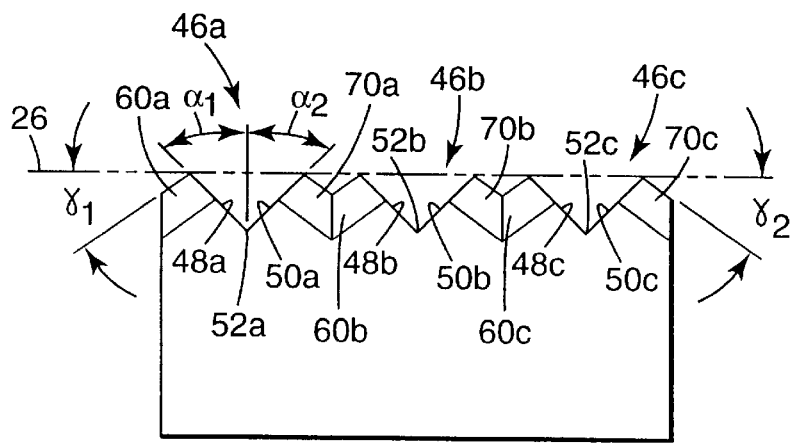
FIG. 20 is an side view of the plurality of laminae following a third machining operation.
Figure 21:
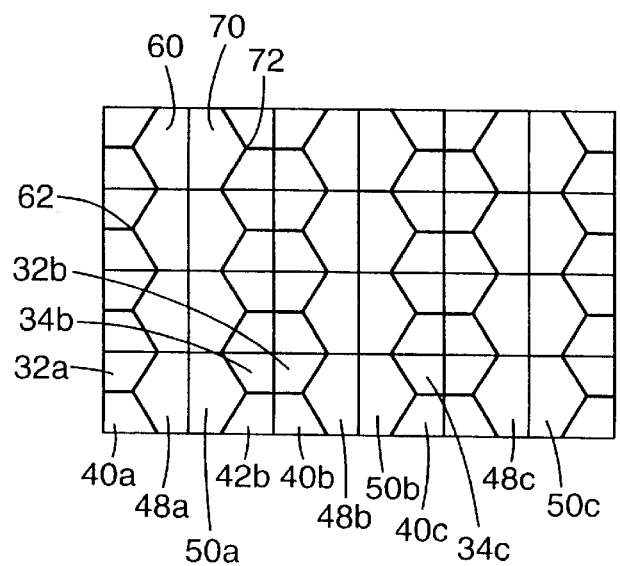
FIG. 21 is a top view of the plurality of laminae following a third machining operation.

FIGS. 13–21 present another method for forming a plurality of laminae suitable for use in a mold suitable for use in forming retroreflective articles. In the embodiment depicted in FIGS. 13–21, a plurality of cube corner elements are formed in the working surfaces of a plurality of laminae while the laminae are secured in an assembly, rather than independently, as described above. The plurality of laminae 10 are preferably assembled such that their respective working surfaces 16 are substantially co-planar. In brief summary, the plurality of laminae 10 are oriented such that their respective major planes are disposed at a first angle, $\theta_1$, relative to a fixed reference axis 82 (see FIG. 14). A first groove set preferably comprising a plurality of parallel, adjacent V-shaped grooves is formed in the working surface 16 of the plurality of laminae 10 (FIGS. 15–16). The plurality of laminae are then oriented such that their respective major planes are disposed at a second angle, $\theta_2$, relative to the reference axis 82 (see FIG. 17). A second groove set comprising a plurality of parallel, adjacent V-shaped grooves is formed the working surface 16 of the plurality of laminae 10 (FIGS. 18–19). The plurality of laminae are then oriented such that their respective first reference planes are disposed substantially parallel to the reference axis and a third groove set comprising a plurality of V-shaped grooves in the working surface 16 of each lamina 10 is formed (FIG. 20). Formation of the third groove set results in a structured surface that includes a plurality of cube corner elements on the working surface of the plurality of laminae 10 (FIG. 21).

The embodiment illustrated in FIGS. 13–21 will now be described in greater detail. Referring to FIG. 13, there is illustrated a plurality of thin laminae 10 assembled together such that the first major surface 12 of one lamina 10 is adjacent the second major surface 14 of an adjacent lamina 10. Preferably, the plurality of laminae 10 are assembled in a conventional fixture capable of securing the plurality of laminae adjacent one another. Details of the fixture are not critical. For purposes of description, however, the fixture preferably defines a base plane 80 which, in a preferred embodiment, is substantially parallel to the bottom surfaces 18 of the respective lamina 10 when the lamina 10 are positioned as depicted in FIG. 13. The plurality of laminae 10 can be characterized in three dimensional space by a Cartesian coordinate system as described above. Preferably, the respective working surfaces 16 of the plurality of laminae 10 are substantially coplanar when the lamina are positioned with their respective first reference planes 24 perpendicular to base plane 80.

Referring to FIG. 14, the plurality of laminae 10 are oriented to have their respective first reference planes 24 disposed at a first angle, $\theta_1$, from a fixed reference axis 82 normal to base plane 80. In one embodiment, the angle $\theta_1$ measures approximately 54.74°. In theory, the angle $\theta_1$ can be any angle between about 45° and about 90°, however, in practice the angle $\theta_1$ can typically measure between about 45° and about 60°. Referring to FIGS. 15–16, a first groove set comprising a plurality of parallel adjacent V-shaped grooves 30a, 30b, 30c, etc. (collectively referred to by reference numeral 30) is formed in the working surfaces 16 of the plurality of laminae 10 with the lamina disposed at angle $\theta_1$. The grooves 30 define respective first groove surfaces 32a, 32b, 32c, etc. (collectively referred to by the reference numeral 32) and respective second groove surfaces 34b, 34c, 34d, etc. (collectively referred to by the reference numeral 34) that intersect at respective groove vertices 33b, 33c, 33d, etc. (collectively referred to by the reference numeral 33). It will be noted that, at the edge of the lamina, the groove forming operation may form a single groove surface, e.g. 32b, 34d. Preferably this pattern is repeated across the entire working surfaces 16 of the plurality of laminae 10.

The grooves 30 are formed by removing portions of working surface 16 of the plurality of laminae using any one of a wide variety of material removal techniques including precision machining techniques such as milling, ruling, and fly-cutting, or chemical etching or laser ablation techniques. According to one embodiment, the grooves 30 of the first groove set are formed in a high-precision machining operation in which a diamond cutting tool having a 120° included angle is repeatedly moved transversely across the working surfaces 16 of the plurality of laminae 10 along an axis that is substantially parallel to base plane 80. It will be appreciated, however that the diamond cutting tool could be moved along an axis that is non-parallel to base plane 80 such that the tool cuts at a varying depth across the plurality of laminae 10. It will also be appreciated that the machining tool could be held stationary while the plurality of laminae are placed in motion; the present disclosure contemplates relative motion between the plurality of laminae 10 and the machining tool.

In the embodiment depicted in FIGS. 15–16, the grooves 30 of the first groove set are formed at a depth such that the respective groove vertices 33 intersect the first major surface 12 and the second major surface 14 of each lamina. Thus, in the end view depicted in FIG. 15, groove vertices 33 form substantially continuous lines that extend along an axis parallel to base plane 80. Further, grooves 30 are formed such that the groove vertices 33 and the edges 36 are disposed in planes that intersect the respective first reference planes 24 and the second reference plane 26 at orthogonal angles. Thus, in a top plan view analogous to FIG. 4, the respective groove vertices would appear perpendicular to the respective first reference planes 24 of the plurality of laminae 10. However, grooves 30 can alternately be formed at lesser depths or along different axes.

Referring to FIGS. 17–19, the plurality of laminae 10 are then oriented to have their respective first reference planes 24 disposed at a second angle, $\theta_2$, from fixed reference axis 82 normal to base plane 80 and a second groove set comprising a plurality of parallel adjacent V-shaped grooves 38b, 38c, etc. (collectively referred to by reference numeral 38) is formed in the working surfaces 16 of the plurality of laminae 10. In the disclosed embodiment, the angle $\theta_2$ measures approximately 54.74°. As discussed above, in theory, the angle $\theta_2$ can be any angle between 45° and 90°, however, in practice the angle $\theta_2$ preferably measures between approximately 45° and 60°. To orient the plurality of laminae 10 at angle $\theta_2$, the laminae 10 are preferably removed from the fixture and reassembled with their respective first reference planes disposed at angle $\theta_2$. The grooves 38 define respective third groove surfaces 40a, 40b, 40c, etc. (collectively referred to by the reference numeral 40) and respective fourth groove surfaces 42b, 42c, 42d, etc. (collectively referred to by the reference numeral 42) that intersect at respective groove vertices 41b, 41c, 41d, etc. (collectively referred to by the reference numeral 41) and along edges 47a, 47b, 47c, etc. It will be noted that, at the edge of the lamina, the groove forming operation may form a single groove surface, e.g. 40a, 42d. Preferably this pattern is repeated across the entire working surfaces 16 of the plurality of laminae 10.

Grooves 38 of the second groove set are also preferably formed by a high-precision machining operation in which a diamond cutting tool having a 120° included angle is repeatedly moved transversely across the working surfaces 16 of the plurality of laminae 10 along a cutting axis that is substantially parallel to base plane 80. Grooves 38 are preferably formed at approximately the same depth in working surface 16 of the plurality of laminae 10 as grooves 30 in first groove set. Additionally, the grooves 38 in the second groove set are preferably formed such that the respective groove vertices (e.g. 41a, 41b, etc.) are substantially coplanar with respective groove vertices (e.g. 33a, 33b, etc.) of the grooves 30 in the first groove set. After forming the grooves 38 in the second groove set, each lamina 10 preferably appears substantially identical to the lamina presented in FIG. 8.

Referring to FIGS. 20–21, a third groove set comprising a plurality of parallel adjacent V-shaped grooves 46a, 46b, 46c etc. (collectively referred to by reference numeral 46) is formed in the working surfaces 16 of the plurality of laminae 10. The third grooves 46a, 46b, 46c, etc. (collectively referred to as 46) define respective fifth groove surfaces 48a, 48b, 48c, etc. (collectively referred to as 48) and respective sixth groove surfaces 50a, 50b, 50c, etc. (collectively referred to as 50) that intersect at a respective groove vertices 52a, 52b, 52c, etc. (collectively referred to as 52). Significantly, the respective third grooves 46 are formed such that respective fifth groove surfaces (e.g. 48a, 48b, 48c, etc.) are disposed substantially orthogonal to the respective first groove surfaces (e.g. 32a, 32b, etc.) and the respective third groove surfaces (e.g. 40a, 40b, 40c, etc.).

Formation of the fifth groove surfaces 48 as described yields a plurality of cube corner elements (e.g. 60a, 60b, 60c, etc.), collectively referred to by reference numeral 60, in working surface 16 of the respective lamina 10. Each cube corner element 60 is defined by a first groove surface 32 a third groove surface 40 and a fifth groove surface 48 that mutually intersect at a point to define a cube corner peak, or apex 62. Similarly, the respective sixth groove surfaces (e.g. 50*a*, 50*b*, 50*c*, etc.) are disposed substantially orthogonal to the respective second groove surfaces (e.g. 34*a*, 34*b*, 34*c*, etc.) and the respective fourth groove surfaces (e.g. 42*a*, 42*b*, 42*c*, etc.). Formation of the sixth groove surfaces 50 also yields a plurality of cube corner elements 70*a*, 70*b*, etc. (collectively referred to by reference numeral 70) in working surface 16 of lamina 10. Each cube corner element 70 is defined by a second groove surface 34, a fourth groove surface 42 and a sixth groove surface 50 that mutually intersect at a point to define a cube corner peak, or apex 72. Preferably, both fifth groove surface 48 and sixth groove surface 50 form a plurality of optically opposing cube corner elements on the working surface 16 of lamina 10. However, it will be appreciated that third groove 46 could be formed such that only fifth groove surfaces 48 or sixth groove surfaces 50 form cube corner elements.

An array of cube corner elements 60, 70 each having three mutually perpendicular optical faces 32, 40, 48 and 34, 42, 50, respectively, are preferably formed on a single lamina. All three optical faces are preferably formed by the machining process to ensure optical quality surfaces. A planar interface 12, 14 is preferably maintained between adjacent laminae during the machining phase and subsequent thereto so as to minimize alignment problems and damage due to handling of the laminae.

Figure 12:
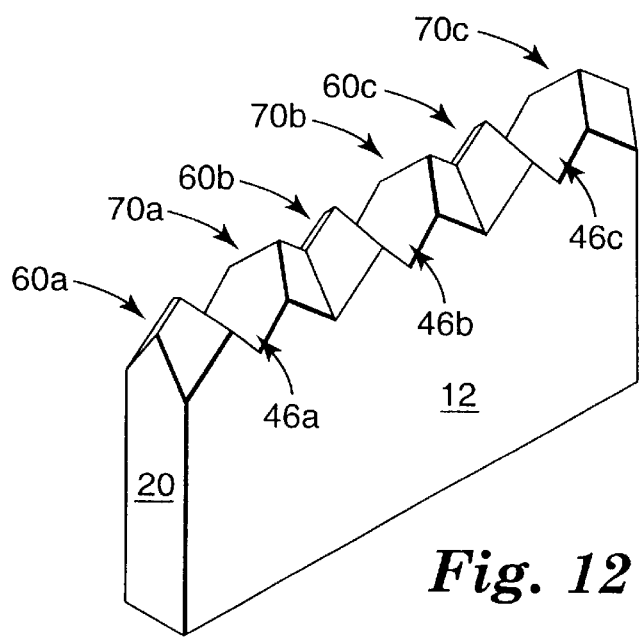
FIG. 12 is a perspective view of a single lamina following a third machining step.

In a preferred method, the plurality of laminae 10 are re-oriented to have their respective major planes 24 disposed approximately parallel to reference axis 82 before forming the plurality of grooves 46. In a preferred embodiment a diamond cutting tool having an included angle of 90° is moved across the working surfaces 16 of the plurality of laminae 10 along an axis that is substantially parallel to base plane 80. However, the grooves 46 can be formed with the lamina oriented such that their respective major planes are disposed at an angle relative to reference axis 82. Grooves 46 are preferably formed such that the respective groove vertices 52 are slightly deeper than the vertices of the grooves in the first and second groove sets. Formation of grooves 46 result in a plurality of laminae 10 having a structured surface substantially as depicted in FIG. 12.

Working surface 16 exhibits several desirable characteristics as a retroreflector. The cube corner element geometry formed in working surface 16 of lamina 10 can be characterized as a 'full' or 'high efficiency' cube corner element geometry because the geometry exhibits a maximum effective aperture that approaches 100% provided the cube corner peaks are positioned approximately in the center of the cube corner element. It will be recognized by one of ordinary skill in the retroreflective arts that the cube corner elements can be designed with their respective peaks offset from the center to address wide entrance angle performance issues or other issues. Thus, a retroreflector formed as a replica of working surface 16 will exhibit high optical efficiency in response to light incident on the retroreflector approximately along the symmetry axes of the cube corner elements. Additionally, cube corner elements 60 and 70 are disposed in opposing orientations and are symmetrical with respect to first reference plane 24 and will exhibit symmetric retroreflective performance in response to light incident on the retroreflector at high entrance angles.

FIGS. 22–30 illustrate an alternate embodiment in which a single lamina is provided with a plurality of cube corner elements that are not optically opposing in orientation. Rather, the cube corner elements depicted in FIGS. 22–30 are disposed in substantially the same orientation. Thus, a retroreflective sheeting formed as a replica of the lamina presented in FIGS. 22–30 will exhibit highly asymmetrical entrance angularity performance. This may be desirable for unidirectional retroreflection applications such as, for example, barricade markers or certain pavement marking applications. A method of forming such a lamina is illustrated particularly with reference to a single lamina. However, it will be appreciated that the machining techniques disclosed in connection with FIGS. 13–21 are equally effective to produce a plurality of lamina.

Figure 24:
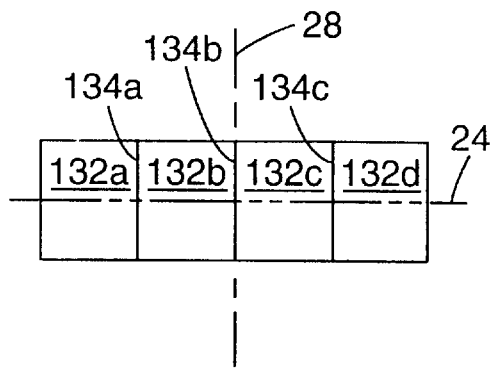
FIG. 24 is a top plan view of the lamina depicted in FIG. 22.
Figure 23:
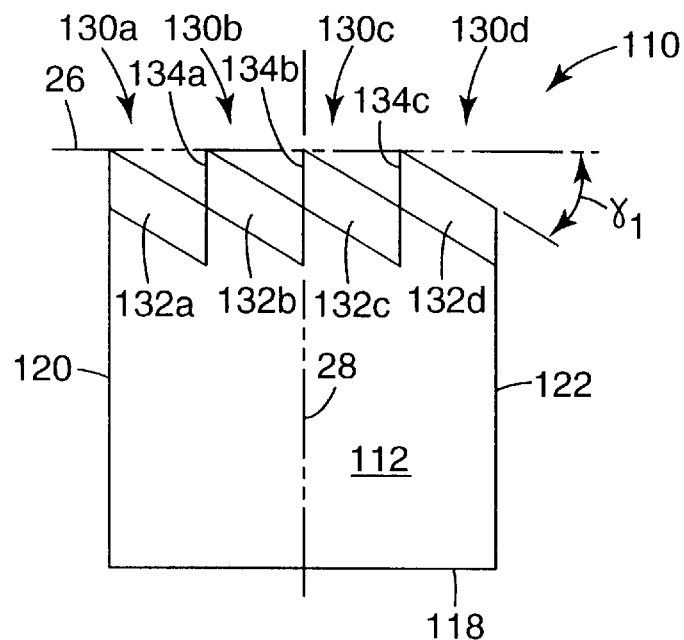
FIG. 23 is a side elevation view of the embodiment depicted in FIG. 22.
Figure 22:
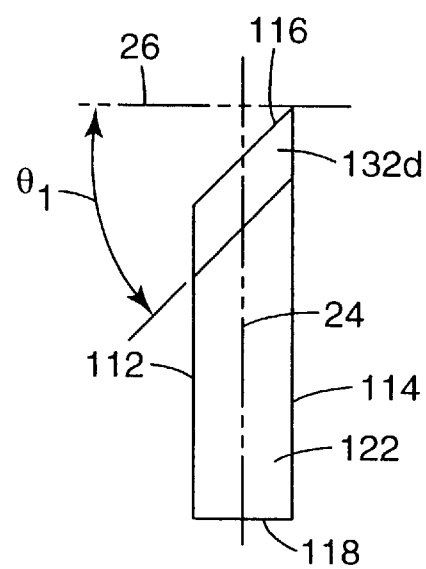
FIG. 22 is an end view of a single lamina after a first machining operation according to an alternate embodiment.
Figure 27:
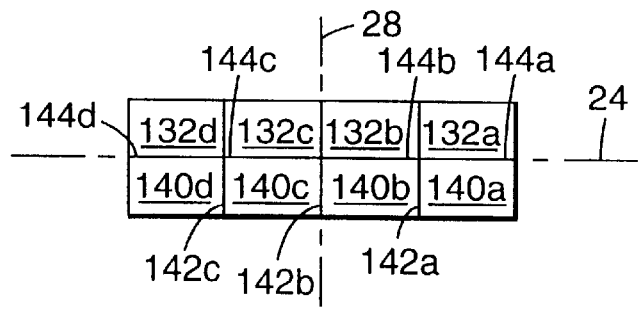
FIG. 27 is a top plan view of the lamina depicted in FIG. 25.
Figure 25:
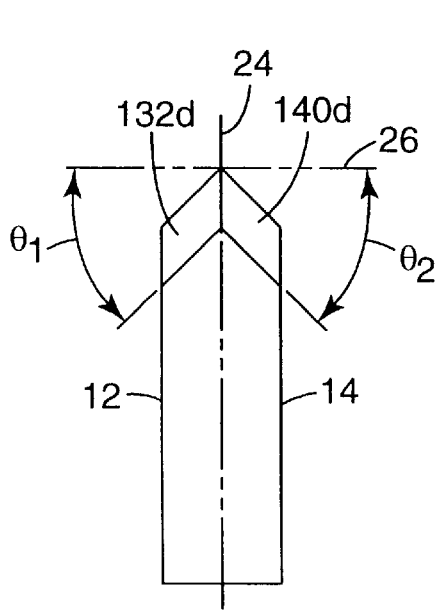
FIG. 25 is an end view of a single lamina after a second machining operation according to an alternate embodiment.
Figure 26:
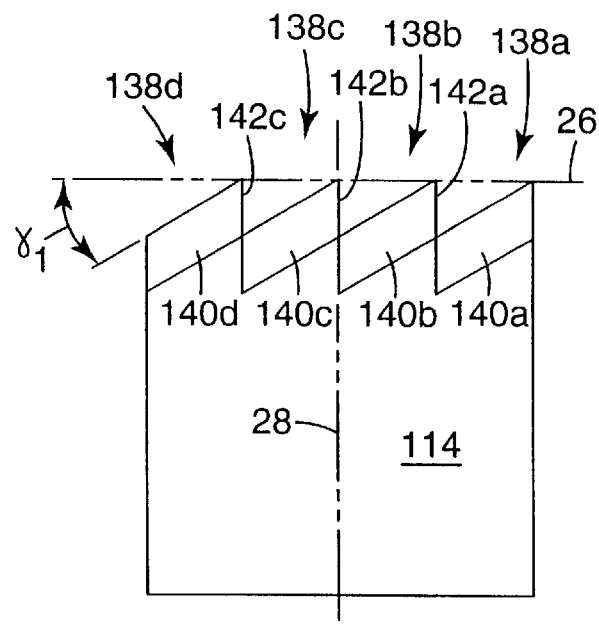
FIG. 26 is a side elevation view of the embodiment depicted in FIG. 25.
Figure 30:
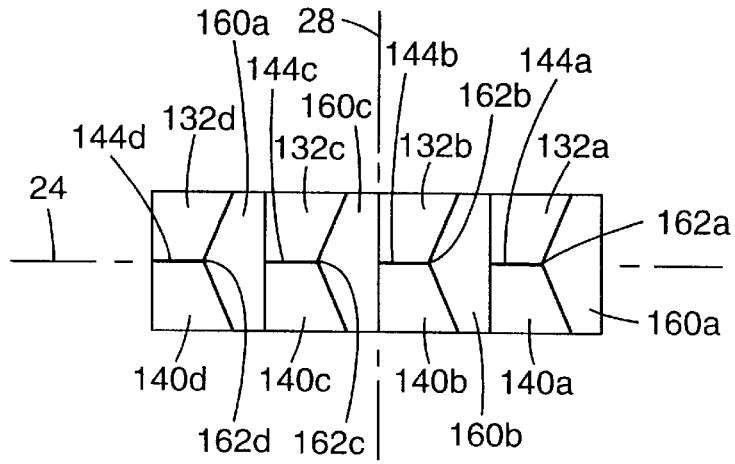
FIG. 30 is a top plan view of the lamina depicted in FIG. 28.
Figure 28:
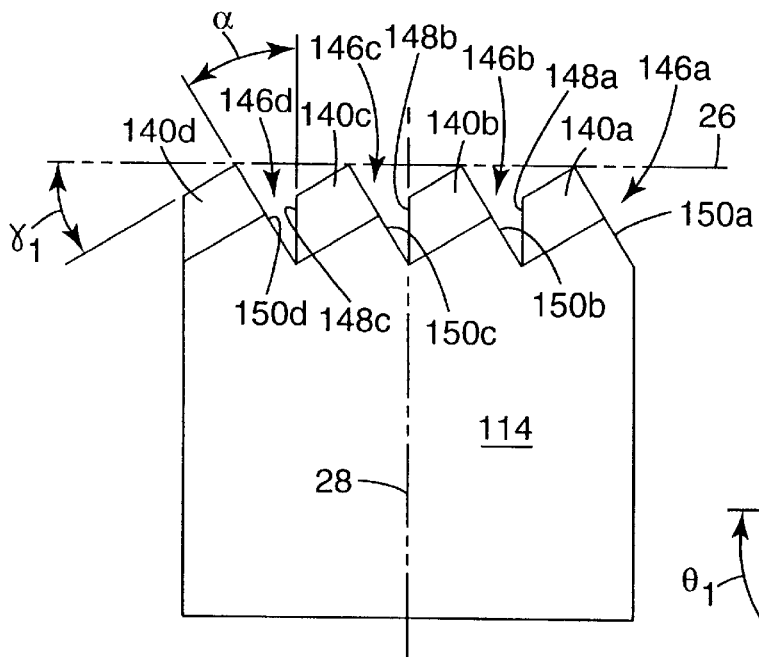
FIG. 28 is a side elevation view of a single lamina after a second machining peration according to an alternate embodiment.
Figure 29:
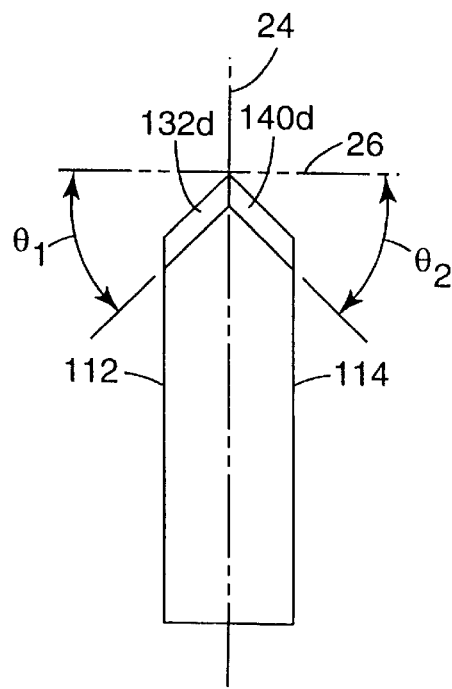
FIG. 29 is an end view of the embodiment depicted in FIG. 28.

In brief summary, a first groove set comprising a plurality of parallel, adjacent grooves 130*a*, 130*b*, 130*c*, etc. (collectively referred to by the reference numeral 130) is formed in the working surface 116 of lamina 110 (FIGS. 22–24). The grooves of the first groove set define respective first groove surfaces 132*a*, 132*b*, 132*c*, etc. and respective second groove surfaces 134*a*, 134*b*, 134*c*, etc. A second groove set comprising at least one, and preferably a plurality of parallel, adjacent grooves 138*a*, 138*b*, 138*c*, etc. (collectively referred to by the reference numeral 138) is also formed in the working surface 116 of lamina 110 (FIGS. 25–27). The grooves of the second groove set define respective third groove surfaces 140*a*, 140*b*, 140*c*, etc. and fourth groove surfaces 142*a*, 142*b*, 142*c*, etc. Importantly, the respective first groove surfaces 132*a*, 132*b*, 132*c*, etc. intersect the respective third groove surfaces 140*a*, 140*b*, 140*c*, etc. substantially orthogonally to define respective first reference edges 144*a*, 144*b*, 144*c*, 144*d*, etc. In the disclosed embodiment the respective second groove surfaces 134*b*, 134*c*, 134*d*, etc. are substantially coplanar with the respective fourth groove surfaces 142*b*, 142*c*, 142*d*, etc. A third groove set comprising a plurality of parallel adjacent grooves 146*a*, 146*b*, 146*c*, etc. is then formed in the working surface 116 of lamina 110 (FIGS. 28–30). The grooves of the third groove set define respective fifth groove surfaces 150*a*, 150*b*, 150*c*, etc. that intersect the respective first groove surfaces 132*a*, 132*b*, 132*c*, etc. and third groove surfaces 140*a*, 140*b*, 140*c*, etc. at an apex 162*a*, 162*b*, 162*c*, 162*d*, etc. substantially orthogonally to form a plurality of cube corner elements 160*a*, 160*b*, 160*c*, disposed in the same orientation on lamina 110.

The lamina depicted in FIGS. 21–30 is preferably formed using precision machining techniques as described above. One embodiment of a lamina may be manufactured by machining the first groove set 130 using a cutting tool that is asymmetric about its vertical axis and having an included angle that measures approximately 66.1° along an axis that intersects second reference plane 26 at an angle $\theta_1$ that measures approximately 50.7°. Similarly, second groove set 138 is preferably formed by machining with a cutting tool that is asymmetric about its vertical axis and having an included angle that measures approximately 66.1° along an axis that intersects second reference plane 26 at an angle $\theta_2$ that measures approximately 50.7°. Finally, third groove set 146 is preferably formed by machining with a half-angle tool having an included angle $\alpha$ that measures approximately 35° along an axis substantially perpendicular to first reference plane 24. The edges 144*a*, 144*b*, 144*c*, 144*d*, etc. are disposed at an angle $\gamma_1$, respectively, that measure approximately 35° from second reference plane 26. In the embodiment of FIG. 28, $\alpha=\gamma_1$.

The foregoing discussion has disclosed several particular embodiments of cube corner element geometries and the associated machining configurations required to produce the geometries. Methods of the present disclosure can be utilized to produce a wide variety of cube corner element geometries by altering the groove angles, (e.g. $\alpha_1$, $\alpha_2$), and the angle at which the laminae are tilted (e.g. $\theta_1$ and $\theta_2$) to thereby change the orientation of the cube corner elements on the working surface of the laminae. Further contemplated are articles manufactured as replicas of the laminae. The preceding discussion disclosed several embodiments of cube corner geometries. The following paragraphs provide a generic description of the angular relationships between the faces of the cube corner elements such that one of ordinary skill in the art could produce a wide variety of cube corner element geometries.

Figure 31:
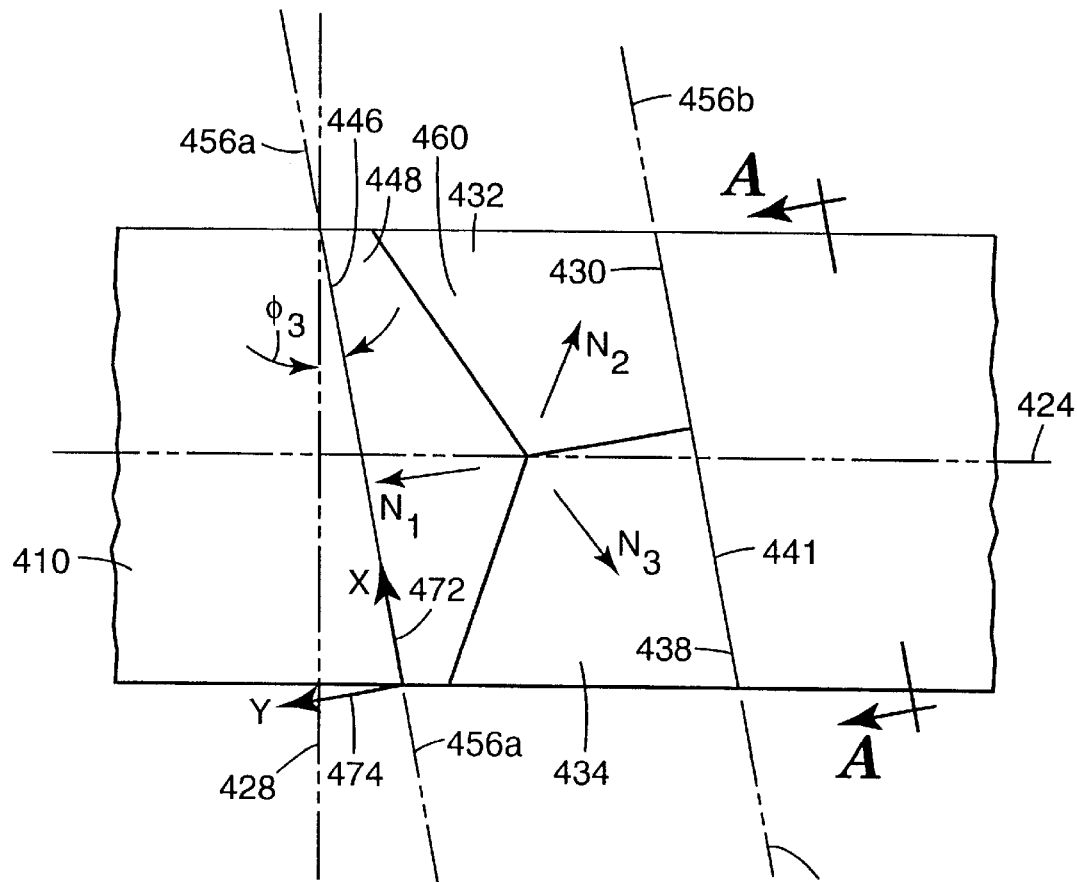
FIG. 31 is a top plan view of a portion of the working surface of a single lamina.
Figure 32:
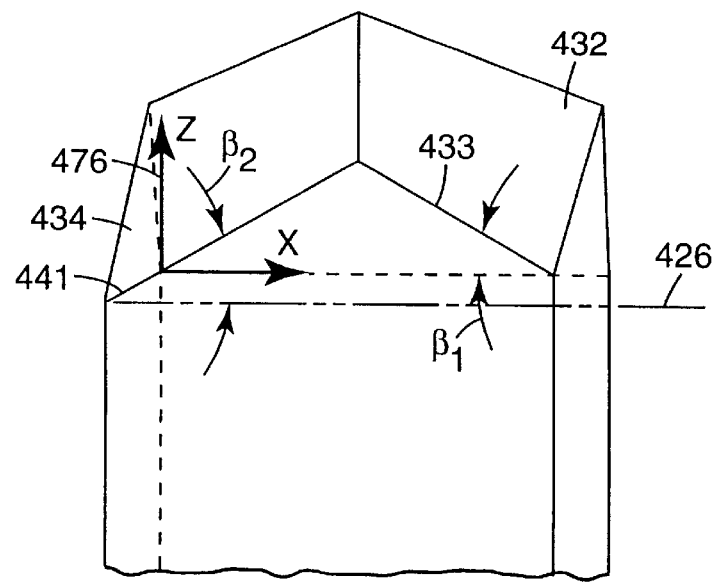
FIG. 32 is a side elevation view of the working surface depicted in FIG. 31.

FIGS. 31–32 present a top plan view and side elevation views of the working surface of a lamina 410 that has a single cube corner element 460 formed therein. Lamina 410 may be characterized in 3-dimensional space by first, second and third reference planes 424, 426 and 428, respectively. For purposes of illustration, cube corner element 460 may be defined as a unit cube consisting of three substantially mutually perpendicular optical faces 432, 434, 448. Optical face 432 is formed by one optical surface of a first groove 430 formed in the working surface of lamina 410 and optical face 434 is formed by an optical surface of a second groove 438 formed in the working surface of lamina 410. Optical face 448 is formed by one surface of groove 446. Reference plane 456a is parallel to the vertex of groove 446 and perpendicular to second reference plane 426. Similarly, reference plane 456b is parallel to the vertex of groove 446 and perpendicular to the second reference plane. Reference planes 456a and 456b are disposed at an angle $\phi_3$ relative to third reference plane 428. The angle $\phi_3$ corresponds to the degree of angular rotation of the cube corner element on the surface of the lamina. Subject to machining limitations, the angle $\phi_3$ can range from 0°, such that the groove sets are formed along axes substantially coincident with reference planes 424 and 428, to nearly 90°. Preferably, however the angle $\phi_3$ measures between 0° and 45°.

Optical face 448 is disposed at an angle $\alpha_1$ from reference plane 456a. Similarly Optical face 432 is disposed at an angle $\alpha_2$ from reference plane 456b and optical face 434 is disposed at an angle $\alpha_3$ from reference plane 456b. Preferably, unit cube 460 is formed using conventional precision machining techniques and angles $\alpha_1$, $\alpha_2$, and $\alpha_3$ correspond to the included angles of the cutting tools used to form the grooves that define cube corner element 460.

FIG. 32 presents a side elevation view of unit cube 460 taken along lines 31—31. The vertex 433 of groove 430 is disposed at an acute angle $\beta_1$ relative to second reference plane 426. Similarly, the vertex 441 of groove 438 is disposed at an acute angle $\beta_2$ relative to second reference plane 426. The orientation in space of optical face 432 is a function of the groove angle $\alpha_1$ and of angle $\beta_1$. Similarly, the orientation in space of optical face 434 is a function of the groove angle $\alpha_2$ and of angle $\beta_2$.

A second Cartesian coordinate system can be established using the groove vertices that form unit cube 460 as reference axes. In particular, the x-axis 472 can be established parallel to the intersection of plane 456a and second reference plane 426, the y-axis 474 can be established parallel to the second reference plane 426 and perpendicular to the x-axis, and the z-axis 476 extends perpendicular to second reference plane 426. Adopting this coordinate system, unit normal vectors $N_1$, $N_2$ and $N_3$ can be defined for the unit cube surfaces 448, 432, and 434, respectively as follows:

$N_1 = \cos(\alpha_1)j + \sin(\alpha_1)k$
$N_2 = \sin(\alpha_2)\sin(\beta_1)i - \cos(\alpha_2)j + \cos(\beta_1)\sin(\alpha_2)k$
$N_3 = -\sin(\beta_2)\sin(\alpha_3)i - \cos(\alpha_3)j + \cos(\beta_2)\sin(\alpha_3)k$ Surfaces 432, 434 and 448 must be substantially mutually perpendicular. Thus, the dot products of the normal vectors equal zero.

$N_1 \cdot N_2 = N_2 \cdot N_3 = N_1 \cdot N_3 = 0$.

Therefore, the following conditions hold:
$\tan(\alpha_1)\tan(\alpha_2)\cos(\beta_1) = 1$
$\tan(\alpha_1)\tan(\alpha_2)\cos(\beta_2) = 1$
$\tan(\beta_1)\tan(\beta_2) = 1 + \tan^2(\alpha_1)$.

These equations define the geometric constraints specifically for unit cube 460. The general approach can be applied by one knowledgeable in the cube corner arts with differing orientations including, for example, cube corner 460.

In the manufacture of retroreflective articles such as retroreflective sheeting, the structured surface of the plurality of laminae is used as a master mold which can be replicated using electroforming techniques or other conventional replicating technology. The plurality of laminae can include substantially identical cube corner elements or can include cube corner elements of varying sizes, geometries, or orientations. The structured surface of the replica, referred to in the art as a 'stamper' contains a negative image of the cube corner elements. This replica can be used as a mold for forming a retroreflector. More commonly, however, a large number of positive or negative replicas are assembled to form a mold large enough to be usefull in forming retroreflective sheeting. Retroreflective sheeting can then be manufactured as an integral material, e.g. by embossing a preformed sheet with an array of cube corner elements as described above or by casting a fluid material into a mold. Alternatively, the retroreflective sheeting can be manufactured as a layered product by casting the cube corner elements against a preformed film as taught in PCT application No. WO 95/11464 and U.S. Pat. No. 3,648,348 or by laminating a preformed film to preformed cube corner elements. By way of example, such sheeting can be made using a nickel mold formed by electrolytic deposition of nickel onto a master mold. The electroformed mold can be used as a stamper to emboss the pattern of the mold onto a polycarbonate film approximately 500 $\mu$m thick having an index of refraction of about 1.59. The mold can be used in a press with the pressing performed at a temperature of approximately 175° to 200° C.

Useful materials for making such reflective sheeting are preferably materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting are disclosed in U.S. Pat. No. 5,450,235 to Smith et al. The sheeting can also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer can be made of any transparent or opaque material, including colored materials, that can be effectively engaged with the disclosed retroreflective sheeting. Suitable backing materials include aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The backing layer or sheet can be sealed in a grid pattern or any other configuration suitable to the reflecting elements. Sealing can be affected by use of a number of methods including ultrasonic welding, adhesives, or by heat sealing at discrete locations on the arrays of reflecting elements (see, e.g. U.S. Pat. No. 3,924,928). Sealing is desirable to inhibit the entry of contaminants such as soil and/or moisture and to preserve air spaces adjacent the reflecting surfaces of the cube corner elements.

If added strength or toughness is required in the composite, backing sheets of polycarbonate, polybutryate or fiber-reinforced plastic can be used. Depending upon the degree of flexibility of the resulting retroreflective material, the material may be rolled or cut into strips or other suitable designs. The retroreflective material can also be backed with an adhesive and a release sheet to render it useful for application to any substrate without the added step of applying an adhesive or using other fastening means.

The cube corner elements disclosed herein can be individually tailored so as to distribute light retroreflected by the articles into a desired pattern or divergence profile, as taught by U.S. Pat. No. 4,775,219. Typically the groove half-angle error introduced will be less than ±20 arc minutes and often less than ±5 arc minutes.

All patents and patent applications referred to, including those disclosed in the background of the invention, are hereby incorporated by reference. The present invention has now been described with reference to several embodiments thereof. It will be apparent to those skilled in the art that many changes can be made in the embodiments described without departing from the scope of the invention. Thus, the scope of the present invention should not be limited to the preferred structures and methods described herein, but rather by the broad scope of the claims which follow.

What is claimed is:

1. A lamina suitable for use in a mold for use in forming retroreflective cube corner articles, the lamina having opposing first and second major surfaces defining therebetween a first reference plane, the lamina further including a working surface connecting the first and second major surfaces, the working surface defining a second reference plane substantially parallel to the working surface and perpendicular to the first reference plane and a third reference plane perpendicular to the first reference plane and the second reference plane, comprising:

a first groove set including one V-shaped groove in the working surface of the lamina, the groove defining a first groove surface and a second groove surface that intersect to define a first groove vertex;

a second groove set including one V-shaped groove in the working surface of the lamina, the groove defining a third groove surface and a fourth groove surface that intersect to define a second groove vertex, the third groove surface intersecting the first groove surface substantially orthogonally to define a first reference edge; and a third groove set including two parallel V-shaped grooves in the working surface of the lamina, each such groove defining a fifth groove surface and a sixth groove surface that intersect to define a third groove vertex that extends deeper into the working surface than the first and second groove vertices, the fifth groove surface of one of the two parallel grooves intersecting substantially orthogonally with the first and third groove surfaces to form a first cube corner disposed in a first orientation.

2. The lamina of claim 1, wherein the fourth groove surface intersects the second groove surface substantially orthogonally to define a second reference edge.

3. The lamina of claim 2, wherein the sixth groove surface of the other of the two parallel grooves intersects substantially orthogonally with the second and fourth groove surfaces to form a second cube corner disposed in a second orientation different from the first orientation.

4. The lamina of claim 1, wherein the first groove vertex is disposed in a plane that intersects the first reference plane at an orthogonal angle.

5. The lamina of claim 1, wherein the first groove vertex is disposed in a plane that intersects the first reference plane at an oblique angle.

6. The lamina of claim 1, wherein at least one of the first, second, and third groove sets are disposed such that, from a top plan view of the working surface, the groove vertices for at least one of the groove sets intersect the first reference plane at an oblique angle.

7. The lamina of claim 1, wherein:

the first groove vertex extends along a first axis that intersects the first major surface of the lamina and the second reference plane, the first axis making an angle $\theta_1$ with respect to the second reference plane; and the second groove vertex extends along a second axis that intersects the second major surface of the lamina and the second reference plane, the second axis making an angle $\theta_2$ with respect to the second reference plane, $\theta_2$ being different than $\theta_1$.

8. The lamina of claim 1, wherein:

the first reference edge extends along an axis that intersects the second reference plane at an acute angle $\gamma_1$ and the fifth groove surface is disposed in a plane that intersects the third reference plane at an acute angle $\alpha_1 = \gamma_1$; and the second reference edge extends along an axis that intersects the second reference plane at an acute angle $\gamma_2$ and the sixth groove surface is disposed in a plane that intersects the third reference plane at an acute angle $\alpha_2 = \gamma_2$.

9. The lamina of claim 1, wherein the first and second major surfaces are substantially planar.

10. A mold comprising a plurality of laminae, including the lamina of claim 1.

11. Retroreflective sheeting formed using a mold derived from the mold of claim 10.

12. A mold comprising a plurality of laminae, including the lamina of claim 3.

13. Retroreflective sheeting formed using a mold derived from the mold of claim 12.

14. A mold comprising a plurality of laminae, including the lamina of claim 6.

15. Retroreflective sheeting formed using a mold derived from the mold of claim 14.

16. A lamina suitable for use in a mold for use in forming retroreflective cube corner articles, the lamina having opposing first and second major surfaces defining therebetween a first reference plane, the lamina further including a working surface connecting the first and second major surfaces, the working surface defining a second reference plane substantially parallel to the working surface and perpendicular to the first reference plane and a third reference plane perpendicular to the first reference plane and the second reference plane, comprising:

a first groove set including one V-shaped groove in the working surface of the lamina, the groove defining a first groove surface and a second groove surface that intersect to define a first groove vertex;

a second groove set including one V-shaped groove in the working surface of the lamina, the groove defining a third groove surface and a fourth groove surface that intersect to define a second groove vertex, the third groove surface intersecting the first groove surface substantially orthogonally to define a first reference edge; and a third groove set including a plurality of V-shaped grooves in the working surface of the lamina, each such groove defining a fifth groove surface and a sixth groove surface that intersect to define a third groove vertex, the fifth groove surface of one of the parallel grooves intersecting substantially orthogonally with the first and third groove surfaces to form a first cube corner disposed in a first orientation;

wherein at least one of the first, second, and third groove sets are disposed such that, from a top plan view of the working surface, the groove vertices for at least one of the groove sets intersect the first reference plane at an oblique angle.

17. The lamina of claim 16, wherein each of the first, second, and third groove sets are disposed such that, from a top plan view of the working surface, the groove vertices for each of the groove sets intersect the first reference plane at an oblique angle.

18. The lamina of claim 16, wherein the first groove vertex and the second groove vertex are disposed in a common reference plane that intersects the first reference plane at an oblique angle.

19. The lamina of claim 18, wherein the common reference plane intersects the second reference plane at an orthogonal angle.

20. The lamina of claim 16, wherein the sixth groove surface of another of the parallel grooves intersects substantially orthogonally with the second and fourth groove surfaces to form a second cube corner element disposed in a second orientation different from the first orientation.

21. A mold comprising a plurality of laminae as set forth in claim 16.

22. Retroreflective sheeting formed using a mold derived from the mold of claim 21.

23. A mold comprising a plurality of laminae as set forth in claim 18.

24. Retroreflective sheeting formed using a mold derived from the mold of claim 23.

25. A method of manufacturing a plurality of laminae for use in a mold suitable for use in forming retroreflective cube corner articles, each lamina having opposing first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane, comprising:

orienting a plurality of laminae to have their respective first reference planes parallel to each other and disposed at a first angle relative to a fixed reference axis;

forming a first groove set including a plurality of V-shaped grooves in the working surface of the laminae, the respective grooves each defining a first groove surface and a second groove surface that intersect to define a first groove vertex;

orienting the plurality of laminae to have their respective first reference planes parallel to each other and disposed at a second angle relative to the fixed reference axis;

forming a second groove set including a plurality of V-shaped grooves in the working surface of the laminae, the respective grooves each defining a third groove surface and a fourth groove surface that intersect to define a second groove vertex, each third groove surface intersecting a respective first groove surface substantially orthogonally to define a first reference edge; and forming a third groove set including a plurality of V-shaped grooves in the working surface of the laminae, the respective grooves each defining a fifth groove surface and a sixth groove surface that intersect to define a third groove vertex, each fifth groove surface intersecting substantially orthogonally with a respective first and third groove surface to form a first cube corner element disposed in a first orientation;

wherein at least one of the forming steps comprises forming grooves having groove vertices that, from a top plan view of the working surface, are disposed at an oblique angle to the first reference plane.

26. The method of claim 25, wherein each sixth groove surface intersects substantially orthogonally with a respective second and fourth groove surfaces to form a second cube corner element disposed in a second orientation different from the first orientation.

27. The method of claim 25, wherein the step of orienting the plurality of laminae to have their respective first reference planes parallel to each other and disposed at a first angle relative to a fixed reference axis comprises assembling the plurality of lamina in a fixture.

28. A method of claim 27, wherein the step of forming the first groove set comprises inducing relative motion between a cutting tool and the working surfaces of the plurality of laminae such that the cutting tool moves parallel to the base plane defined by the fixture.

29. The method of claim 25, wherein at least one of the forming steps comprise forming adjacent grooves at different depths in the working surface of the laminae.

30. The method of claim 25, wherein at least one of the forming steps comprises varying the distance between adjacent grooves in the working surface of the laminae.

31. The method of claim 25, wherein each of the forming steps comprises a machining operation selected from the group of machining operations consisting of ruling, fly-cutting, grinding and milling.

32. The method of claim 25, wherein each groove in the first, second, and third groove sets has an included angle that measures between about 10° and about 170°, and further wherein the third groove vertex extends deeper into the working surface than the first and second groove vertices.

33. The method of claim 27, wherein the step of orienting the plurality of laminae to have their respective first reference planes parallel to each other and disposed at a second angle relative to the fixed reference axis comprises reassembling the plurality of lamina in the fixture.

34. The method of claim 25, wherein each of the first cube corner elements are located on essentially a single lamina.

35. The method of claim 25, wherein adjacent first and second major surfaces comprise a substantially planar interface.

36. A plurality of lamina manufactured according to the method of claim 25.

37. The method of claim 25, further comprising:

replicating the working surface of the mold to form a negative copy of the first cube corner elements suitable for use as a mold for forming retroreflective articles.

38. A mold manufactured according to the method of claim 37.

39. Retroreflective sheeting formed from the mold of claim 38.

* * * * *